(12) United States Patent
Contreras

(10) Patent No.: US 10,835,809 B2
(45) Date of Patent: Nov. 17, 2020

(54) AUDITORIUM EFFICIENT TRACKING IN AUDITORY AUGMENTED REALITY

(71) Applicant: Kristina Contreras, Los Angeles, CA (US)

(72) Inventor: Kristina Contreras, Los Angeles, CA (US)

( * ) Notice: Subject to any disclaimer, the term of this patent is extended or adjusted under 35 U.S.C. 154(b) by 131 days.

(21) Appl. No.: 16/112,647

(22) Filed: Aug. 25, 2018

(65) Prior Publication Data

US 2019/0060741 A1 Feb. 28, 2019

Related U.S. Application Data

(60) Provisional application No. 62/550,582, filed on Aug. 26, 2017, provisional application No. 62/623,552, filed on Jan. 30, 2018.

(51) Int. Cl.
*A63F 13/212* (2014.01)
*H04S 7/00* (2006.01)
*A63F 13/428* (2014.01)
*A63F 13/211* (2014.01)

(52) U.S. Cl.
CPC .......... *A63F 13/212* (2014.09); *A63F 13/211* (2014.09); *A63F 13/428* (2014.09); *H04S 7/303* (2013.01)

(58) Field of Classification Search
CPC .... A63F 13/212; A63F 13/211; A63F 13/428; H04S 7/303
See application file for complete search history.

(56) References Cited

U.S. PATENT DOCUMENTS

| | | | |
|---|---|---|---|
| 9,367,960 B2 | 5/2016 | Poulos et al. | |
| 9,754,415 B2 | 9/2017 | Fleck et al. | |
| 9,788,714 B2 | 10/2017 | Krueger | |
| 9,864,192 B2 | 1/2018 | Fu | |
| 9,983,692 B2 | 5/2018 | Mallinson et al. | |
| 2006/0045294 A1* | 3/2006 | Smyth | H04S 7/304 381/309 |
| 2007/0265089 A1* | 11/2007 | Robarts | A63F 13/12 463/42 |

(Continued)

FOREIGN PATENT DOCUMENTS

| | | |
|---|---|---|
| CN | 106598230 | 4/2017 |
| WO | WO 2014/015378 A1 | 1/2014 |
| WO | WO 2018/081609 A1 | 5/2018 |

*Primary Examiner* — Jasson H Yoo
(74) *Attorney, Agent, or Firm* — David M Peer

(57) ABSTRACT

Tracking the location and orientation of a user in an augmented reality application is generally power and processor intensive. While a relatively high degree of accuracy in user tracking may be required for visual augmented reality applications, a lesser degree of accuracy may be required for auditory augmented reality applications. Modified methods of pedestrian dead-reckoning may be used to effectively track a user, while keeping power consumption and computational load relatively small. An interactive auditory augmented reality experience, in the form of a haunted house game, may be produced without relying on GPS or visual tracking methods. Efficient user tracking methods allow a user to experience an interactive auditory augmented reality experience by using a relatively small auditory augmented reality device.

11 Claims, 9 Drawing Sheets

(56) References Cited

U.S. PATENT DOCUMENTS

| | | | |
|---|---|---|---|
| 2012/0122570 A1* | 5/2012 | Baronoff | A63F 13/655 |
| | | | 463/31 |
| 2012/0319949 A1 | 12/2012 | Lee | |
| 2017/0038213 A1* | 2/2017 | Han | G01C 21/16 |
| 2017/0206673 A1 | 7/2017 | Kawamoto | |
| 2017/0337743 A1 | 11/2017 | Metzler et al. | |
| 2017/0371406 A1 | 12/2017 | Yang et al. | |
| 2018/0012413 A1 | 1/2018 | Jones et al. | |
| 2018/0025544 A1 | 1/2018 | Schoeller et al. | |
| 2018/0206069 A1* | 7/2018 | Santos | H04W 4/021 |

* cited by examiner

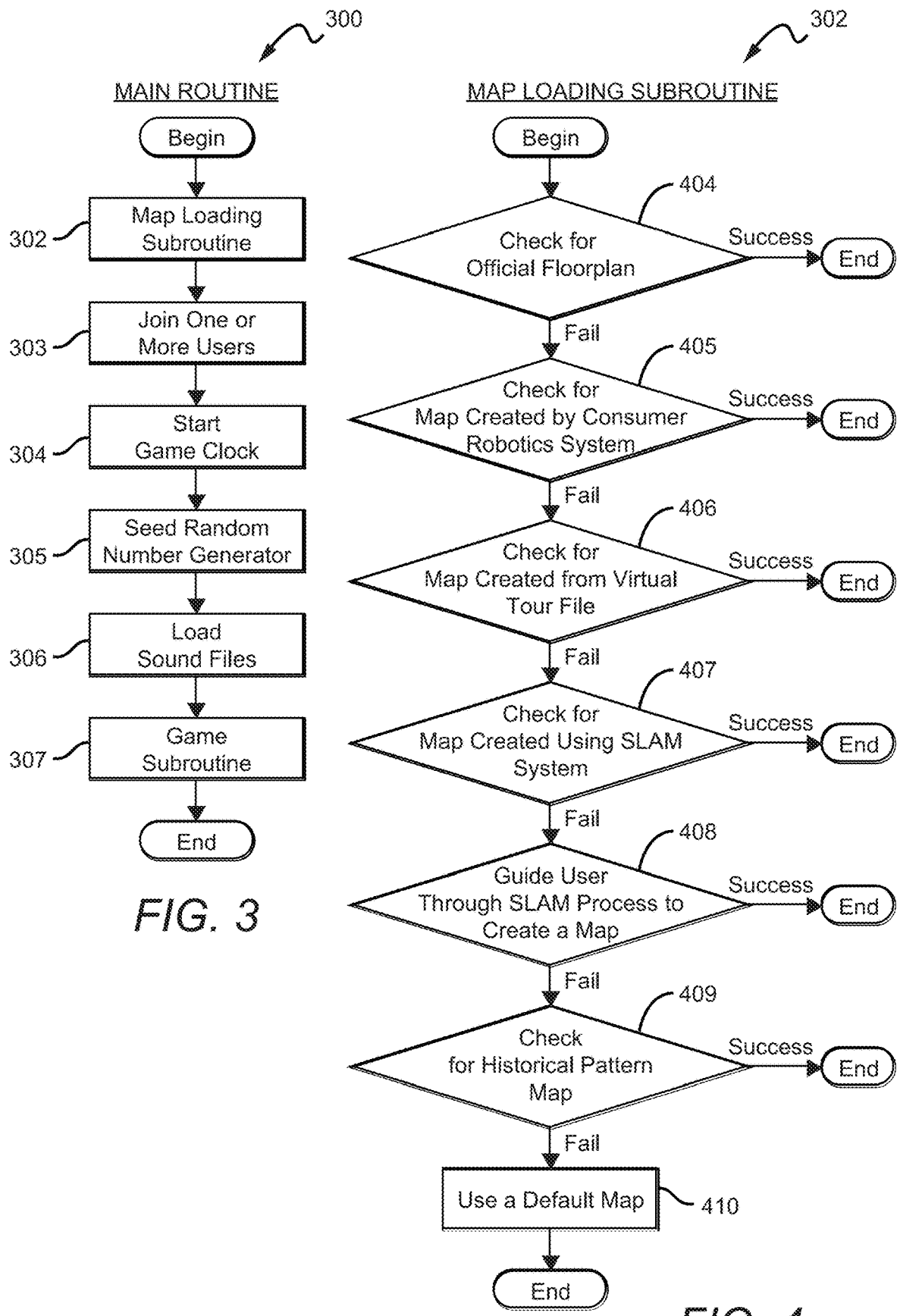

US 10,835,809 B2

AUDITORIUM EFFICIENT TRACKING IN AUDITORY AUGMENTED REALITY

CROSS REFERENCE TO RELATED APPLICATIONS

This application claims the benefit of U.S. Provisional Application No. 62/550,582, filed on Aug. 26, 2017 and U.S. Provisional application No. 62/623,552, filed on Jan. 30, 2018.

BACKGROUND OF THE INVENTION

Augmented reality is a version of our "real," physical world augmented with virtual effects. Many augmented reality devices and applications focus primarily on adding virtual images to the real physical world. More recently, some augmented reality devices have incorporated 3-dimensional sound fields to add to the realism of an augmented reality world. To maintain a realistic augmented reality experience, a user's position and orientation is typically tracked, such that virtual objects and sounds may be appropriately manipulated as the user moves.

Current methods for tracking a user's location in augmented reality applications are relatively power and processor intensive, requiring relatively bulky battery and processing components. Such methods include GPS, visual tracking methods, radar, laser-based tracking methods, and methods based on installing relatively bulky auxiliary equipment in a physical space. To contain the bulky components necessary for user tracking current augmented reality devices that produce interactive 3-dimensional sound fields are necessarily relatively large. Large head mounted displays (HMDs) are currently the norm for augmented reality applications that incorporate interactive 3-dimensional sound fields.

The popular form factor of earbud style headphones is not sufficiently voluminous to contain the bulky components required by current methods of tracking a user and producing interactive 3-dimensional sound fields. Therefore, current applications of auditory augmented reality, in which a user's movements and location are tracked, are limited to bulky and specialized headphones. There is thus a need for less power and processor intensive methods to track a user's location in auditory augmented reality applications that present interactive 3-dimensional sound fields.

BRIEF SUMMARY OF THE INVENTION

One aspect of the disclosure relates to presenting an interactive auditory augmented reality scene to a user. A system configured to facilitate tracking a user's position and orientation and configured to present an interactive auditory augmented reality scene to the user may create or load a map of the user's physical surroundings. One or more additional users may join the interactive auditory augmented reality experience, a game clock may start, and a random number generator may be seeded. The system may load sound files that may be required for the interactive auditory augmented reality experience and a game subroutine may be initiated.

The game subroutine may be configured to facilitate modeling and rendering an interactive 3-dimensional sound field. As the user moves about the physical space, the game subroutine may execute a footstep detection subroutine and pedestrian dead-reckoning subroutine to facilitate up dating the user's location and orientation. The interactive 3-dimensional sound field may be remodeled and/or re-rendered to account for the user's updated position and orientation and/or due to updates in the game state such as the movement of a virtual character with artificial intelligence. The interactive 3-dimensional sound field may be presented to the user using a one or more components capable of outputting sound.

One application of at least one embodiment of the present invention may be to facilitate the presentation of a haunted house game. In the haunted house game, a system may be configured to facilitate transforming a user's house, or other building, into a spooky auditory augmented reality game. The user may wear a pair of earbud-style headphones, which include an inertial measurement unit (IMU) and a computing module. The headphones may present to the user an interactive 3-dimensional (3D) sound field that may include spooky sounds such as the voice of a ghost, a boiling cauldron, or an attacking monster. These sounds may appear to the user to come from particular locations in the house. As the user moves through the house and reorients, the 3-dimensional sound field may be remodeled and/or re-rendered to present a realistic auditory augmented reality experience to the user.

These and other objects, features, and characteristics of the system and/or method disclosed herein, as well as the methods of operation and functions of the related elements of structure and the combination of parts and economies of manufacture, will become more apparent up on consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification in the claims, the singular form of "a", "an", and "the" include plural references unless the context clearly dictates otherwise.

BRIEF DESCRIPTION OF THE DRAWINGS

FIG. 3 is a flowchart illustration of a main routine for facilitating an interactive auditory augmented reality experience.

FIG. 4 is a flowchart illustration of a map loading subroutine.

DETAILED DESCRIPTION OF THE INVENTION

Various embodiments and aspects of the disclosure will be described with references to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Some portions of the detailed descriptions which follow are presented in terms of algorithms, sequences, or processes which include operations on data stored within a computer's memory. The operations typically require or involve physical manipulations of physical quantities. Usually, though not necessarily, these quantities take the form of electrical or magnetic signals capable of being stored, transferred, combined, compared, and otherwise manipulated.

Unless specifically stated otherwise as apparent from the following discussion, it is appreciated that throughout the description, discussions utilizing terms such as "processing" or "computing" or "recognizing" or "calculating" or "determining" or "displaying" or "receiving" or the like can refer to the action and process of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purpose, or it may comprise a general purpose computer selectively activated or reconfigured by a computer program stored in the computer. Such a computer program may be stored in a machine-readable storage medium.

Auditory Augmented Reality Device

Figure 1:
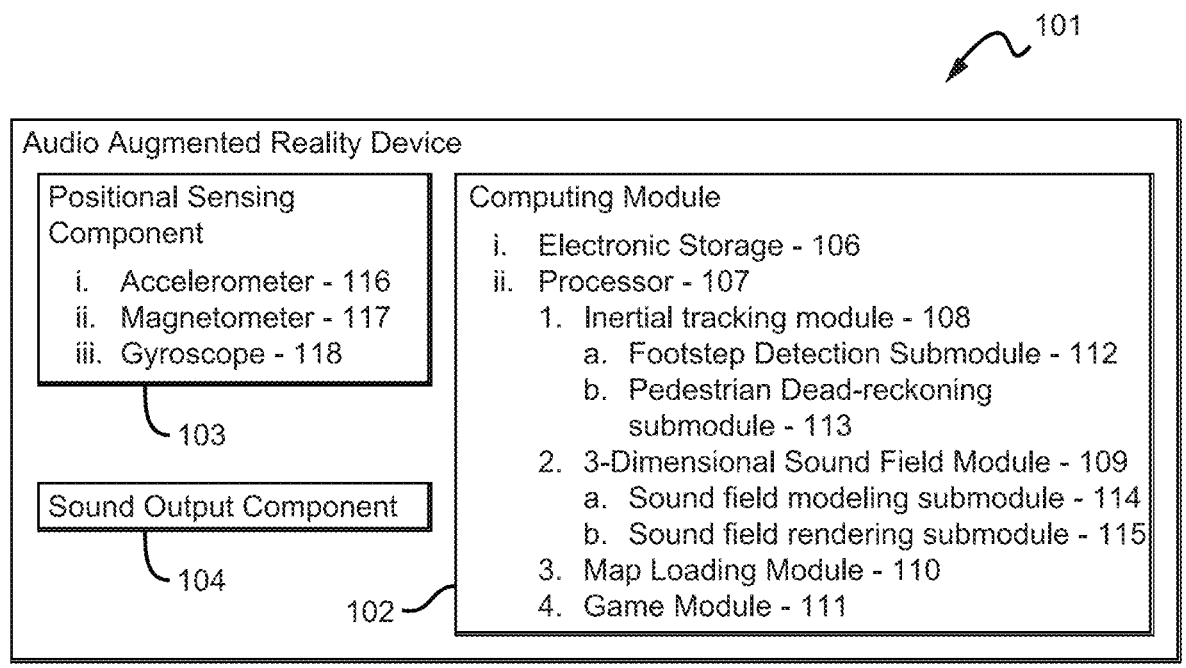
FIG. 1 is a schematic illustration of the overall configuration of an auditory augmented reality device.

FIG. 1 illustrates the overall configuration of an auditory augmented reality device 101. The auditory augmented reality device 101 may comprise at least a computing module 102, a positional sensing component 103, and a sound output component 104. The computing module 102 may comprise at least an electronic storage component 106 and a processor 107. Processor 107 may include at least an inertial tracking module 108, a 3D sound field module 109, a map loading module 110 and a game module 111. The inertial tracking module 108 may include at least a footstep detection submodule 112 and a pedestrian dead-reckoning submodule 113. The 3D sound field module 109 may include at least a 3D sound field modeling submodule 114 and a 3D sound field rendering submodule 115.

Positional sensing component 103 may comprise at least an accelerometer 116, magnetometer 117, and gyroscope 118. In at least one embodiment, positional sensing component 103 may be an inertial measurement unit (IMU) as may be found in modern smartphones. A plethora of other sensors may be included in positional sensing component 103, such as GPS sensors, cameras, radar sensors, and more. However, inclusion of sensors that result in relatively high computational loads and power consumption, or sensors that are relatively voluminous, may cause auditory augmented reality device 101 to be too large to be worn by a user in an earbud form factor. Therefore, in at least one embodiment of the present invention, the sensory components of positional sensing component 103 are limited to an accelerometer 116, a magnetometer 117, and a gyroscope 118. In another embodiment, the sensory components of positional sensing component 103 are limited to an accelerometer 116, and a gyroscope 118. While visual augmented reality applications may require a relatively high degree of accuracy in tracking a user's position and orientation, an augmented reality scene that includes only auditory effects may be passable with a lower degree of user tracking accuracy.

Sound output component 104 may be one or more speakers, which includes at least a cone, coil, and magnet. Alternatively, sound output component 104 may be a bone conduction component or another component that causes vibration. Further examples of sound producing components may be speakers with two coils and one permanent magnet, balanced armature, piezoelectric speakers, electrostatic speakers, magnetorestrictive speakers, and thermoacoustic speakers. In at least one embodiment, positional sensing component 103 and computing module 102 may be components of a single system on a chip (SOC). As used herein, a component may refer to a single physical element or multiple physical elements. For example, a speaker component may include multiple speakers or multiple devices that act in concert to produce sound.

Interactive Auditory Augmented Reality System

Figure 2:
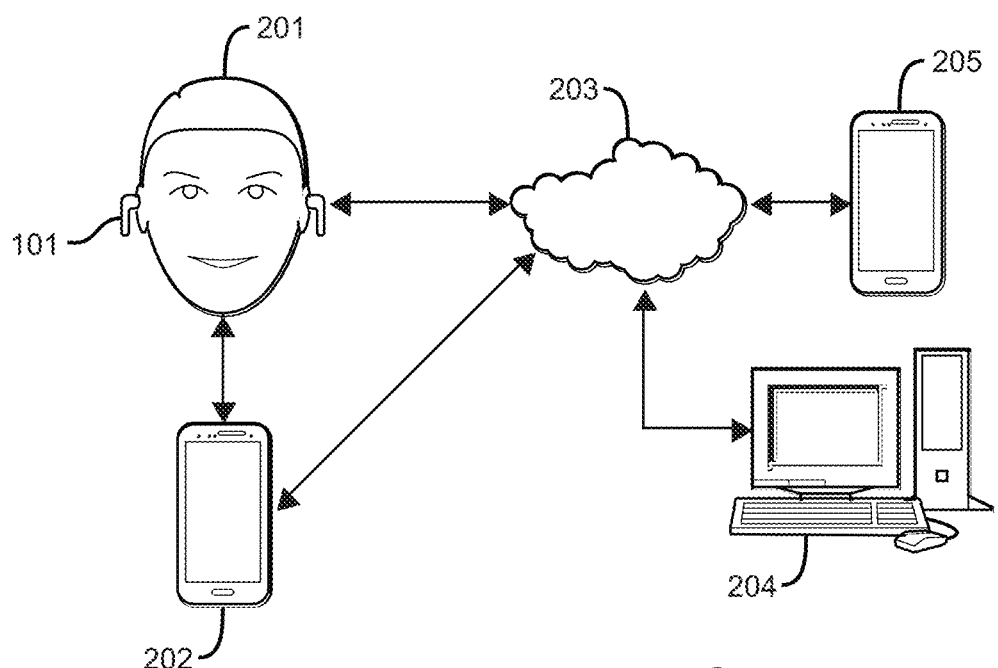
FIG. 2 is a schematic illustration of a system configured to present an interactive auditory augmented reality experience to a user.

FIG. 2 illustrates a schematic drawing of a system configured to present an interactive auditory augmented reality experience to a user 201. The user 201 may wear the auditory augmented reality device 101, which may be in an earbud form factor. The auditory augmented reality device 101 may be connected to client computing device 202 and connected wirelessly to network 203. The connection between augmented reality device 101 and computing device 202 may be wired or wireless. In at least one embodiment, computing device 202 is a smartphone. Network 203 may be connected to a server 204. Additionally, network 203 may be connected to one or more additional client computing devices 205. In at least one embodiment, computing device 205 may be a smartphone.

To reduce the computational load on auditory augmented reality device 101, one or more of processing modules 108, 109, 110, and 111 may be performed on either client computing device 202 or server 204. Auditory augmented reality device 101 may, but need not, include a wireless communication antenna. If augmented reality device 101 is connected to client computing device 202 using a wired connection, client computing device 202 may connect wirelessly to network 203, allowing auditory augmented reality device 101 to receive data from network 203 through the wired connection between client computing device 202 and auditory augmented reality device 101. In another embodiment, auditory augmented reality device 101 or client computing device 202 may connect directly to server 204 and/or client computing device 205.

Main Routine

FIG. 3 illustrates a flowchart of a main routine sequence 300 for facilitating an interactive auditory augmented reality experience. The operations of main routine 300 are intended to be illustrative. In some implementations, main routine 300 may be accomplished with one or more additional operations not described, and/or without one or more of the operations discussed. Additionally, the order in which the operations of main routine 300 are illustrated in FIG. 3 and described below is not intended to be limiting.

In some implementations, main routine 300 may be implemented in one or more processing devices (e.g a digital processor, an analog processor, a digital circuit designed to process information, an analog circuit designed to process information, a state machine, and/or other mechanisms for electronically processing information). The one or more processing devices may include one or more devices executing some or all of the operations of main routine 300 in response to instructions stored electronically on an electronic storage medium. The one or more processing devices may include one or more devices configured through hardware, firmware, and/or software to be specifically designed for execution of one or more of the operations of main routine 300. The one or more processing devices may be present in auditory augmented reality device 101, client computing device 202, server 204, and/or client computing device 205.

At operation 302 a map loading subroutine may be executed, whereby a map of a physical space may be returned to main routine 300. Operation 302 may be performed by a map loading module that is the same as or similar to map loading module 110.

At operation 303 one or more user's may join an auditory augmented reality game session. A user may select a level to play. For example, various types of haunted house games may be available. One haunted house level may have a Transylvania inspired vampire theme, whereas another haunted house level may have a New Orleans inspired Voodoo theme. Levels may also be differentiated on the type of game available to the user. In some levels, a user may be prompted to take part in a timed scavenger hunt, or an escape room experience. On other levels, the user may simply be allowed to wander freely through the haunted house, interacting with the auditory augmented reality scene at their leisure.

At operation 304 a game clock may be initiated. The game clock may be a clock that measures the amount of time that has elapsed since the game has begun.

At operation 305, a random number generator may be seeded. Once a random number generator has been seeded, it may produce random numbers. Those random numbers may be relied on for, among other things, triggering random in game events, as discussed in more detail with respect to game subroutine 307.

At operation 306 sound files may be loaded. The sound files may data for include original sound sources, which are discussed in further detail in the discussion of FIGS. 7, 8, and 9.

At operation 307 game subroutine 307 may be executed. The operations of game subroutine 307 are discussed in more detail in the discussed of FIG. 5.

Map Loading Subroutine

FIG. 4 illustrates a flowchart of a map loading subroutine 302 for obtaining a map of a physical space. The operations of map loading subroutine 302 are intended to be illustrative. In some implementations, map loading subroutine 302 may be accomplished with one of more additional operations not described, and/or without one or more of the operations discussed. Additionally, the order in which the operations of map loading subroutine 302 are illustrated in FIG. 4 and described below is not intended to be limiting.

In some implementations, map loading subroutine 302 may be implemented in one or more processing devices (e.g a digital processor, an analog processor, a digital circuit designed to process information, an analog circuit designed to process information, a state machine, and/or other mechanisms for electronically processing information). The one or more processing devices may include one or more devices executing some or all of the operations of map loading subroutine 302 in response to instructions stored electronically on an electronic storage medium. The one or more processing devices may include one or more devices configured through hardware, firmware, and/or software to be specifically designed for execution of one or more of the operations of map loading subroutine 302. The one or more processing devices may be present in auditory augmented reality device 101, client computing device 202, server 204, and/or client computing device 205. Map loading subroutine 302, and some or all of the operations thereof, may be performed by a map loading module that is the same as or similar to map loading module 110.

At operation 404 one or more databases may be queried for an official floorplan of a physical building. An official floorplan may include an architectural blueprint or an official map of the building that may have been provided by an owner, tenant, or other person. If an official floorplan is identified, the official floorplan is loaded and returned to main routine 300. If no official floorplan is identified, map loading subroutine 302 may advance to operation 405.

At operation 405, one or more databases may be queried for a map of the physical building created by a consumer robotics system. Consumer robotics systems, such as a Roomba, may generate a map of a physical building while performing their tasks, such as vacuuming. If a map of the physical building created by a consumer robotics system is identified, the map is loaded and returned to main routine 300. If no map created by a consumer robotics system is identified, map loading subroutine 302 may advance to operation 406.

At operation 406, one or more databases may be queried for a map generated from a 3D virtual tour of the physical building 3D virtual tours are a common tool used by real estate and interior design professionals to provide potential purchasers or renters with a virtual rendition of the interior of a physical building. If, for example, the building was recently sold or rented, a 3D virtual tour of the property may be available through a platform such as Matterport. If no 3D virtual tour is identified, map loading subroutine 302 may advance to operation 407. If a 3D virtual tour is identified and has been converted to a schematic floorplan, the schematic floorplan is loaded and returned to main routine 300. If a 3D virtual tour is identified but it has not been converted to a schematic floorplan, map loading subroutine 302 may advance to operation 407. Additionally, if a 3D virtual tour is identified, but it has not been converted to a schematic floorplan, a request may be made to a 3D virtual tour company, such as Matterport, to generate a schematic floorplan. Such a request typically takes a significant amount of time to process, but if a schematic floorplan is produced, it may be used in a later iteration of map loading subroutine 302.

At operation 407, one or more databases may be queried for a map of the physical building generated using a simultaneous localization and mapping (SLAM) system. Current commercially available SLAM systems include ARKit and ARCore. If a map of a physical building created by a SLAM system is identified, the map is loaded and returned to main routine 300. If no SLAM generated map of the building is identified, map loading subroutine 302 may advance to operation 408.

At operation 408, a user may be prompted to generate a map of the building using a SLAM system. If the user possesses client computing device 202 in the form of a smartphone, the user may have or be able to download a SLAM system. The user may be able to walk through the building with client computing device 202, to generate a map. If the user is successful in generating a map of the building using a SLAM system, that map is loaded and returned to main routine 300. If the user is not successful in generating a map of the building map loading subroutine 302 may advance to operation 409.

At operation 409, one or more databases may be queried for a historical pattern map of the building A description of a historical map may be found below in the discussion of FIG. 14.

At operation 410, a default map may be loaded and returned to main routine 300. The default map may be a generic map designed to best approximate the physical building A number of default maps may be available, depending on input from the user. The user may be prompted to input information regarding the physical building such as the number of bedrooms, approximate square feet, number of bathrooms, and number of floors.

Databases for the various types of maps discussed above may be accessed through network 203, server 204, client computing device 202, and/or client computing device 205. Alternatively, a map database may exist in electronic storage component 106. With respect to operation 405, a map created by a consumer robotics system map also be obtained directly from a consumer robotics system.

Figure 6:
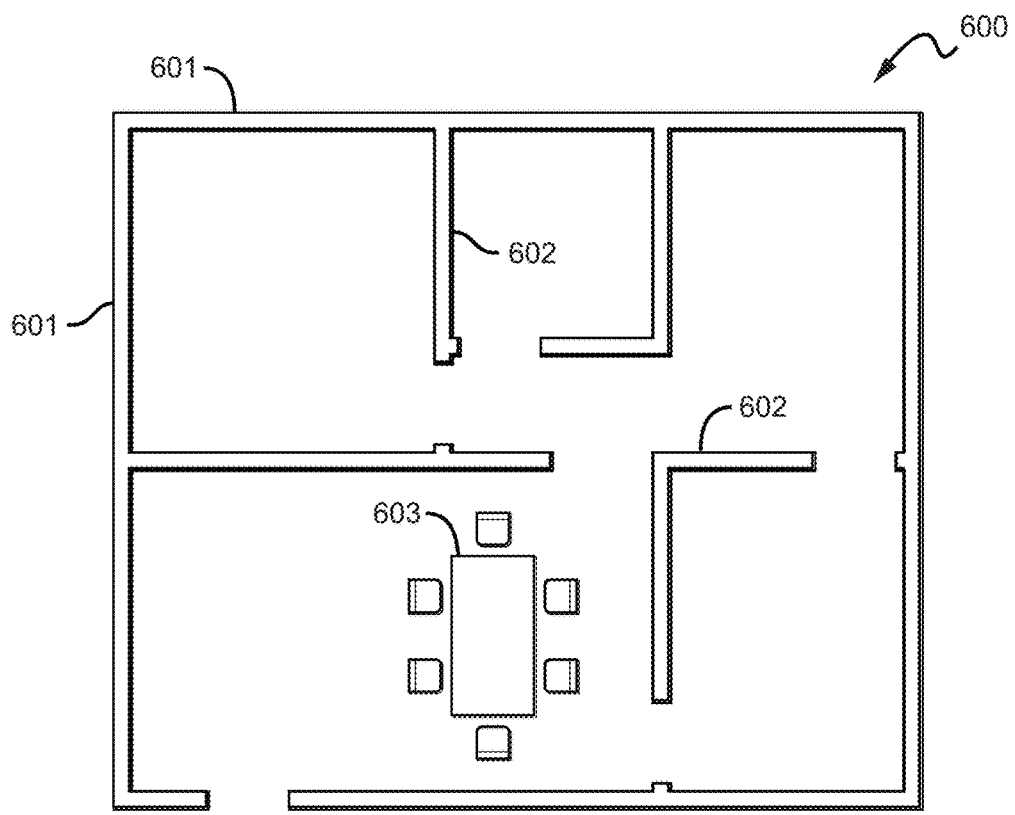
FIG. 6 is a diagram illustration of a map of the interior of a physical building.

FIG. 6 is an illustration of a diagram of a map of the interior of a physical building. The map 600, may include exterior walls 601, interior walls 602 and physical objects in the building such as dinner table 603. Map 600 may be loaded by a module that is the same as or similar to map loading module 110. When map loading subroutine 302 is executed, it may return a map such as map 600. While the discussions of maps with respect to FIGS. 4, 6, 7, and 8 may refer to a map of a physical building maps of other spaces may also be loaded and may be used for the modeling and rendering of a 3D sound field. For example, an auditory augmented reality experience may take place in an outdoor park, allowing many users to simultaneously participate in the experience. In such a scenario, a map of the outdoor park may be loaded.

Game Subroutine

Figure 5:
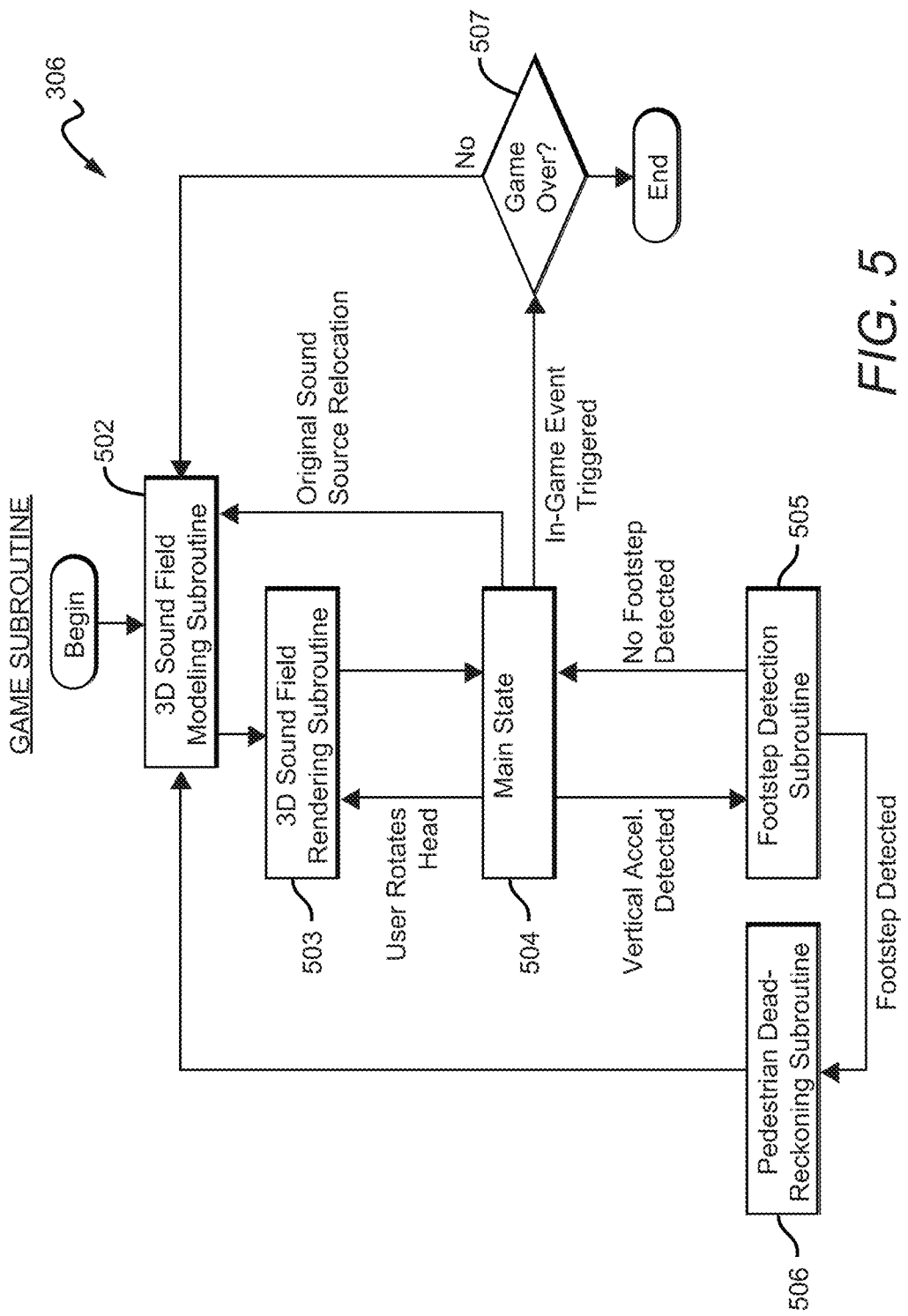
FIG. 5 is a flowchart illustration of a game subroutine.

FIG. 5 illustrates a flowchart of a game subroutine 307 for facilitating an interactive auditory augmented reality experience. The operations of game subroutine 307 are intended to be illustrative. In some implementations, game subroutine 307 may be accomplished with one of more additional operations not described, and/or without one or more of the operations discussed. Additionally, the order in which the operations of game subroutine 307 are illustrated in FIG. 5 and described below is not intended to be limiting.

In some implementations, game subroutine 307 may be implemented in one or more processing devices (e.g a digital processor, an analog processor, a digital circuit designed to process information, an analog circuit designed to process information, a state machine, and/or other mechanisms for electronically processing information). The one or more processing devices may include one or more devices executing some or all of the operations of game subroutine 307 in response to instructions stored electronically on an electronic storage medium. The one or more processing devices may include one or more devices configured through hardware, firmware, and/or software to be specifically designed for execution of one or more of the operations of game subroutine 307. The one or more processing devices may be present in auditory augmented reality device 101, client computing device 202, server 204, and/or client computing device 205. Game subroutine 307 may be performed by a game module that is the same as or similar to game module 111.

For the purposes of simplicity in the present discussion of the game subroutine 307, we will assume that a user is wearing auditory augmented reality device 101, in the form of earbuds. We further assume that all processing for the game subroutine is occurring on auditory augmented reality device 101. This simplified explanation is not intended to be limiting.

At operation 502, 3D sound field modeling subroutine 502 may be executed to produce a model of a 3D sound field of the building Operation 502 may be performed by a 3D sound field modeling module that is the same as or similar to 3D sound field modeling submodule 114.

At operation 503, 3D sound field rendering subroutine 503 may be executed to produce a rendering of a 3D sound field. Operation 503 may be performed by a 3D sound field rendering module that is the same as or similar to 3D sound field rendering submodule 115.

At operation 504, a main state may be executed. Alternative events may occur during the main state, leading to alternative outcomes. If gyroscope 118 detects a rotation, it may be presumed that the user has turned their head. In order to filter out insignificant movements and noise, a frequency filter may be applied to filter out high frequency movements. Ideally, the frequency threshold may be 10 Hz or 100 Hz. If a potential user head rotation is registered, game subroutine 307 may loop back to 3D sound field rendering subroutine 503 and a new rendering of the 3D sound field may be produced. Alternatively, accelerometer 116 may detect that the user is accelerating along the vertical axis. If a user is accelerating along the vertical access, there is a significant chance that the user may be taking a footstep. If accelerometer 116 detects acceleration along the vertical axis, footstep detection subroutine 505 may be executed. If footstep detection subroutine 505 returns that the user has not taken a footstep, the game subroutine loops back to main state 504. On the other hand, if footstep detection subroutine 505 returns that the user has taken a footstep, the game subroutine 307 may advance to pedestrian dead-reckoning subroutine 506.

Alternatively, during main state 504, an original sound source may be relocated, which may cause the game subroutine to loop back to 3D sound field modeling subroutine 502. Alternatively, during main state 504 an in-game event may be triggered, which may cause the game subroutine 307 to advance to operation 507. An in-game event may be triggered randomly. The randomness of such a randomly triggered event may be based on the results of seeding the random number generator at operation 305 of the main routine 300. An in-game event may also be triggered by the passage of time. The passage of time may be tracked by a game clock, as initiated at operation 304. Using the non-limiting example of a haunted house game, a random in-game event may be that a monster is released from a point on the map and the monster begins to pursue the user.

Another example of an in-game event might be that after a predetermined period of time has passed, the game ends. Another example of an in-game event might be that a user comes within a certain proximity to a virtual ghost, causing the virtual ghost to flee in fear.

At operation 507, depending on the type of in-game event that is triggered, the game subroutine 307 may either end, or it may loop back to 3D Sound field modeling subroutine 502. Again, using the non-limiting example of the haunted house game, the release of the virtual monster may loop the game subroutine 307 back to 3D sound field modeling subroutine 502, such that the sound field may be remodeled to account for the new sound source. Alternatively, after the passage of a predetermined period of time, the game subroutine 307 may end.

To the extent that more than one user is playing a game, game subroutine 307 may be run concurrently for each user. To add an exciting effect to an auditory augmented reality experience, smarthome lighting may be incorporated. Smarthome lighting systems allow users to control lighting through computer applications, as opposed to relying solely on light switches. Rather than have the user control the smarthome software manually, the game system may control the smarthome automatically based on the game state and/or game events. During a haunted house game experience for example, smarthome lighting may be set to flicker at the position where the sound of a virtual ghost's voice is coming from or the lights might suddenly go out in response to an in-game trigger, or might flash brightly for a split second at the same time as a lighting/thunder sound effect. Furthermore, smarthome systems that contain one or more light bulbs that can change color in response to software (e.g Philips Hue) may be used by the game system for additional creative effects such as turning all of the lights in the house to be the color of blood red.

3D Sound Field Modeling and Rendering

A 3D sound field may be the range of sounds that exist in a 3-dimensional physical space. For example, when a person is sitting in their living room, they may experience sound coming from a television, air conditioner, passing cars, and the dishwasher running in an adjacent room. The 3D sound field of the living room would include all the sounds that the sitting person would hear. One goal of an auditory augmented reality experience may be to model a 3D sound field, render the 3D sound field, and present the 3D sound field to the user in a convincing manner. Using the example of the haunted house game, which should not be construed as limiting various virtual sounds may be presented to a user wearing earbud headphones. A user may hear spooky sounds such as the voice of a ghost, a boiling cauldron, or an attacking monster.

Figure 7:
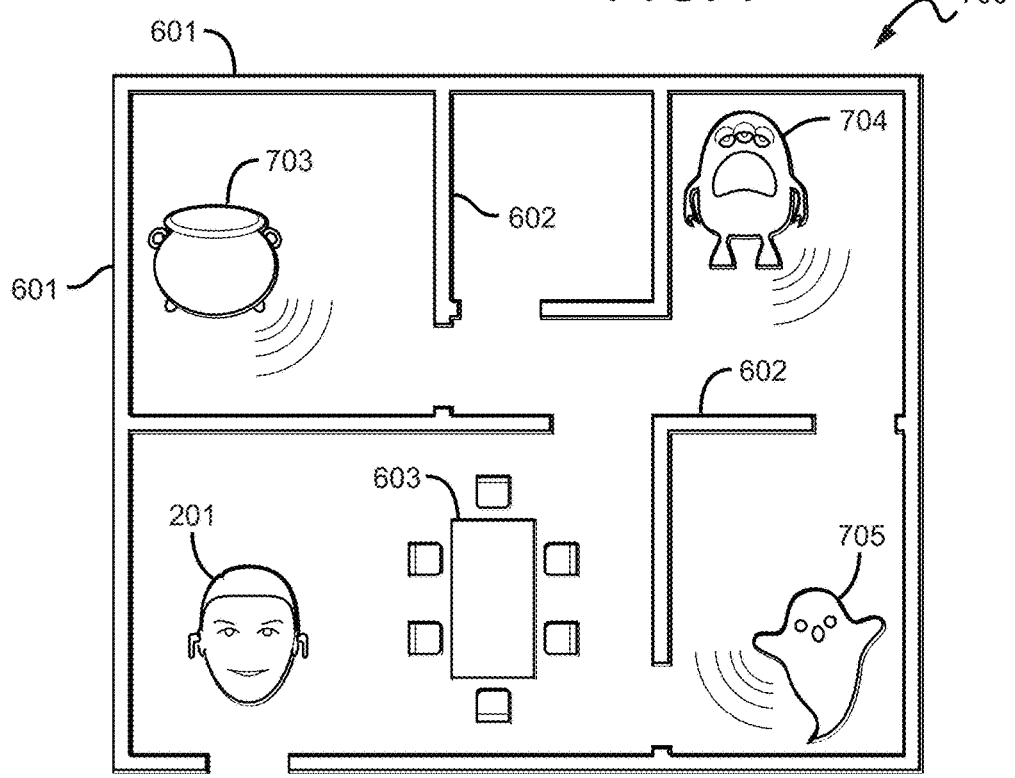
FIG. 7 is a diagram illustration of a model of a 3D sound field with original sound sources.

FIG. 7 is an illustration of an example of a 3D sound field model 700. A model of a 3D sound field may be a mathematical or schematic representation of a sound field. In the auditory augmented reality context, the 3D sound field may be populated with virtual sounds. In FIG. 7, 3D sound field model 700 comprises the map 600 of a physical building populated with virtual sounds. Virtual cauldron 703, virtual monster 704, and virtual ghost 705 are virtual items, each of which are original sound sources. An original sound source may be the point in 3D sound field model 700 from which an original sound originates.

Figure 8:
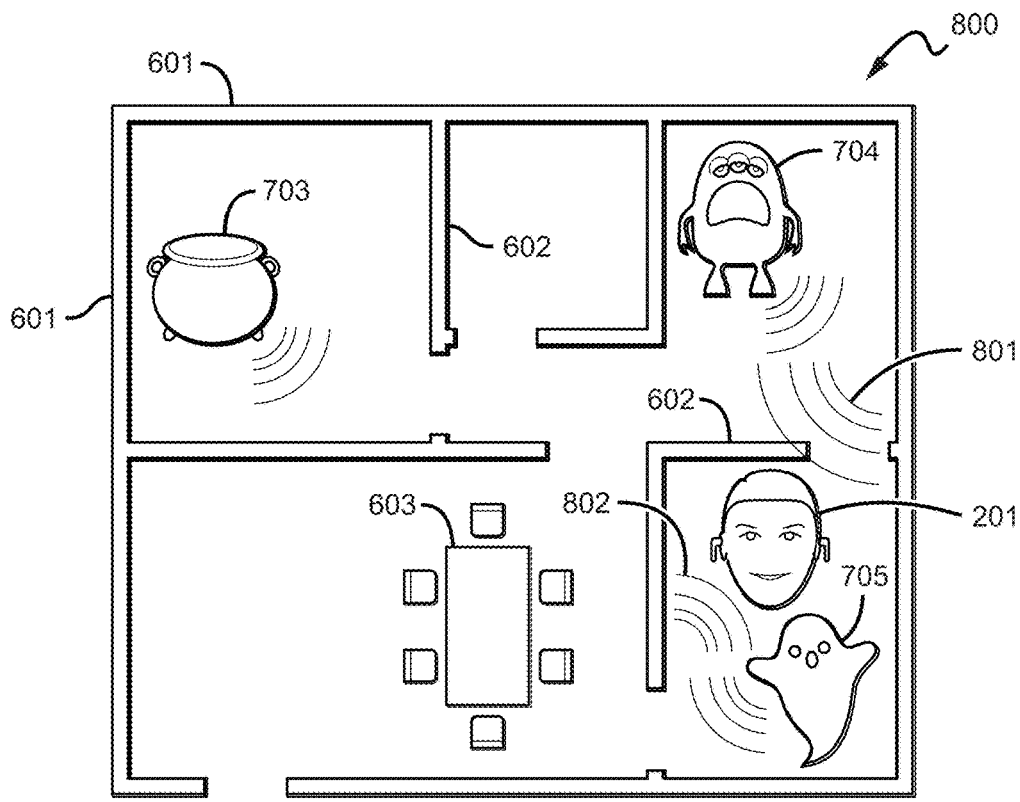
FIG. 8 is a diagram illustration of a model of a 3D sound field with original and reflected sound sources.

FIG. 8 is an illustration of an example of a model of a 3D sound field model 800, which includes reflected sound sources 801 and 802. 3D sound field model 800 comprises the map of a physical building 600, populated with original sound sources from the virtual cauldron 703, virtual monster 704, and virtual ghost 705, and populated with reflected sound sources 801 and 802. A reflected sound source, as opposed to an original sound source, may be populated where an original sound should be reflected off of an interior wall 602, or other object, such as dining table 603. Reflected sound sources allow the production of a more realistic auditory augmented reality scene in which virtual sounds app ear to reflect off of objects in a similar manner as do real sounds.

It should be appreciated that, while FIG. 6, FIG. 7, and FIG. 8 are two dimensional illustrations, map 600, 3D sound field model 700, and 3D sound field model 800 may be three dimensional.

Figure 9:
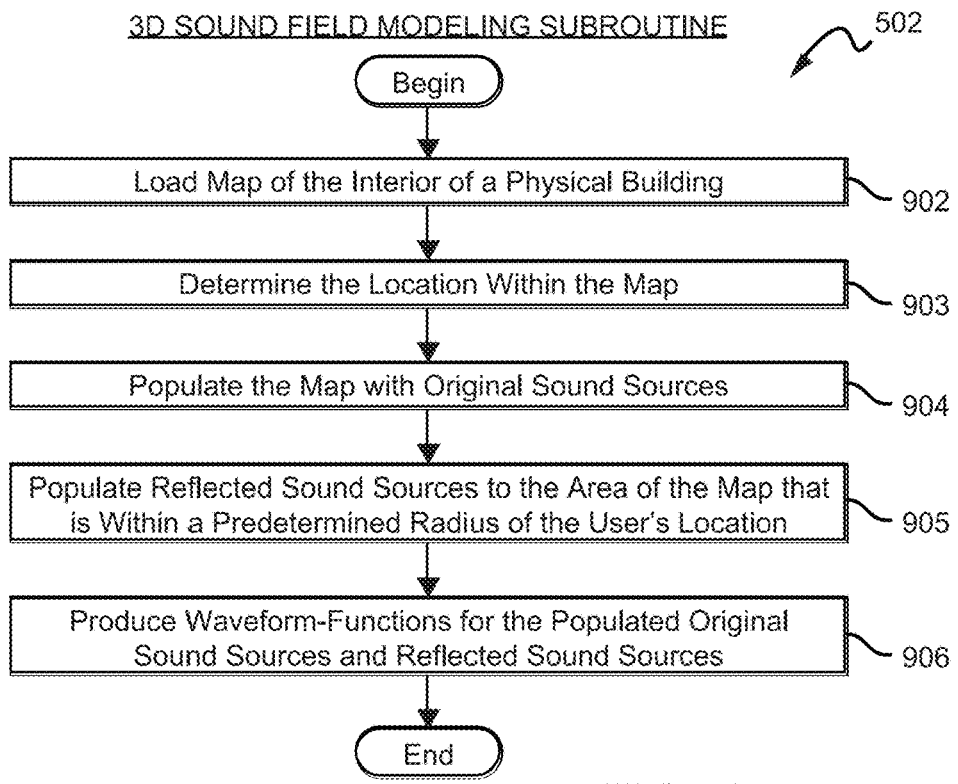
FIG. 9 is a flowchart illustration of a 3D sound field modeling subroutine.

FIG. 9 illustrates a flowchart of a 3D sound field modeling subroutine 502 for modeling a 3D sound field. The operations of 3D sound field modeling subroutine 502 are intended to be illustrative. In some implementations, 3D sound field modeling subroutine 502 may be accomplished with one of more additional operations not described, and/or without one or more of the operations discussed. Additionally, the order in which the operations of 3D sound field modeling subroutine 502 are illustrated in FIG. 9 and described below is not intended to be limiting.

In some implementations, 3D sound field modeling subroutine 502 may be implemented in one or more processing devices (e.g a digital processor, an analog processor, a digital circuit designed to process information, an analog circuit designed to process information, a state machine, and/or other mechanisms for electronically processing information). The one or more processing devices may include one or more devices executing some or all of the operations of 3D sound field modeling subroutine 502 in response to instructions stored electronically on an electronic storage medium. The one or more processing devices may include one or more devices configured through hardware, firmware, and/or software to be specifically designed for execution of one or more of the operations of 3D sound field modeling subroutine 502. The one or more processing devices may be present in auditory augmented reality device 101, client computing device 202, server 204, and/or client computing device 205. 3D sound field modeling subroutine 502 may be performed by a 3D sound field modeling submodule that is the same as or similar to 3D sound field modeling submodule 114.

At operation 902 a map of the interior of a physical building may be loaded. The physical building may be a physical building that is currently occupied by a user and the map may be map 600 and map 600 may be provided by map loading module that is the same as or similar to map loading module 110.

At operation 903, a user's location may be determined. During a first iteration of 3D sound field modeling subroutine 502 the user's position may be predetermined. For example, at the start of a game, the user may be instructed to stand in a specific location in the building and to look in a specific direction. It may then be assumed that the user followed these instructions and in fact is in the predetermined position. Alternatively, during the first iteration of 3D sound field modeling subroutine 502, the user's position may be established with any number of user tracking techniques, such as GPS. If the user is wearing auditory augmented reality device 101, which does not have a GPS module or other suitable module that may facilitate establishing the user's initial position, but the user has a client computing device 202 in the form of a smartphone, the user's smartphone may relay information to facilitate establishing the user's initial position. In subsequent iterations of 3D sound field modeling 502 in which the user's initial position was established, but a footstep has been detected, the user's new position may be provided by a dead-reckoning submodule that is the same or similar to pedestrian dead-reckoning submodule 113.

At operation 904, map 600 may be populated with original sound sources. Examples of original sound sources include virtual cauldron 703, virtual monster 704, and virtual ghost 705. The data for original sound sources may be loaded during the sound loading operation 306 of the main routine 300. If multiple users are joined in the same game, the original sound sources may be different for each user. For example, an original sound source may be targeted to a particular user, and may not be heard by another user in the same game. Operation 904 may be performed by a 3D sound field modeling submodule 114.

At operation 905, map 600 may be further populated by reflected sound sources, such as reflected sound sources 801 and 802. In order to reduce battery usage and computational load, it may be desirable to only populate reflected sound sources that are within a certain distance of the user's location, as determined in operation 903. For example, reflected sound sources from an original sound source that is greater than 7 meters away from a user may not be populated. In FIG. 8, virtual cauldron 703 is outside of the predetermined radius and therefore no reflected sound sources are populated for virtual cauldron 703. Moreover, in order to reduce battery usage and computational load, it may be desirable to limit the number of populated sound sources, per original sound source. In the real world, a point source of sound in a hallway may bounce back and forth off of the walls many times as the soundwave travels along the hallway. Nonetheless, a sufficiently realistic 3D sound field may be produced without modeling and outputting each reflection of the sound. For example, an original sound source may be limited to 2 reflections. Operation 905 may be performed by a 3D sound field modeling submodule 114.

At operation 906 real-time waveform-functions associated with original sound sources and reflected sound sources may be generated. Real-time waveforms are mathematical representations of sound that are dependent on time. Real-time waveforms of original sound sources may be derived from sound files loaded during the sound file loading operation 306 of the main routine 300. A real-time waveform function will output a real-time waveform based on various inputs. Some inputs may include: the current time, one or more real-time waveforms, results from a random number generator, the real-time results from one or more other real-time waveform functions, a map of a building a user's location, assumed material properties of physical objects or walls. Inputs may further include any other data available to the game module 111. Inputs may also include sensory inputs such as the inputs from one or more microphones contained in device 101 or device 202. Using the non-limiting example of a haunted house game, virtual cauldron 703 is an original sound source and thus a real-time waveform function will be produced. As with the waveform of a real boiling cauldron, the real-time waveform for a virtual cauldron 703 will change over time. For example, the sound of a rolling boil may be relatively constant over time, but the sound of liquid splashing against the floor may be added periodically. Real-time waveforms of reflected sound sources may be derived from corresponding real-time waveforms of original sound sources, or other reflected sound sources. The material properties of a physical obstruction from which a reflected sound source has reflected may contribute to the production of a real-time waveform of a reflected sound source. A real-time waveform of a reflected sound source may further account for the number of reflections that the reflected sound source has experienced, relative to the original sound source from which it may be derived. Operation 906 may be performed by a 3D sound field modeling submodule 114.

3D sound field modeling subroutine 502 may return a 3D sound field model to game subroutine 307. 3D sound field model 800 may be an example of a 3D sound field model returned by 3D sound field modeling subroutine 502.

Figure 10:
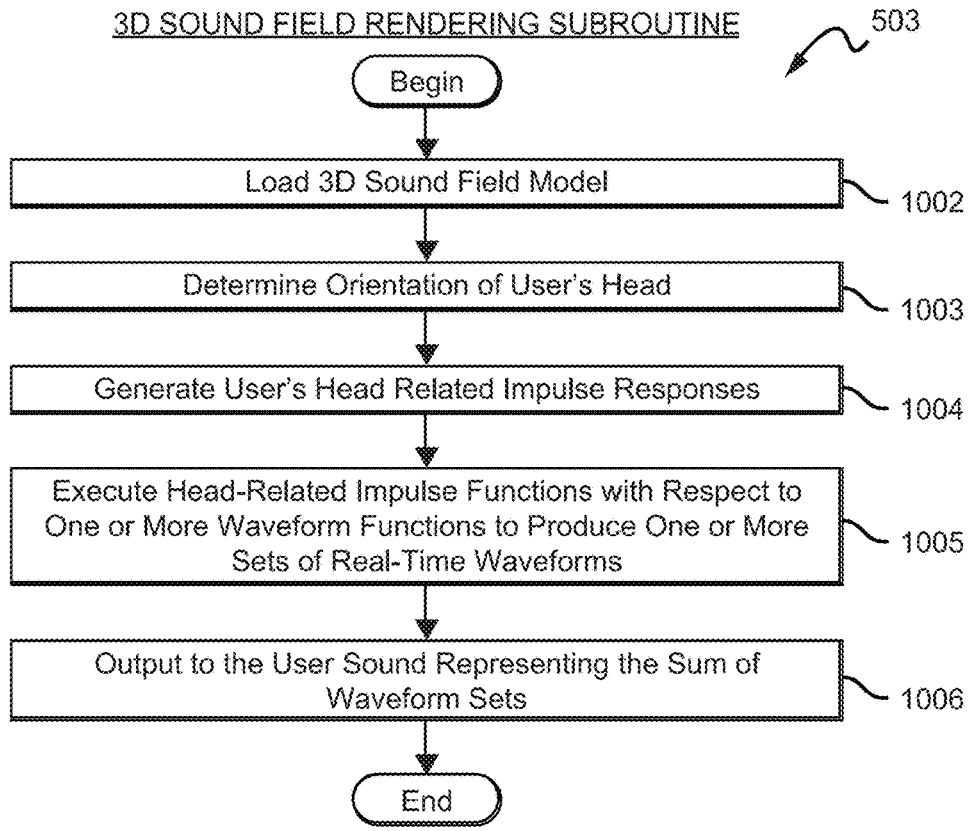
FIG. 10 is a flowchart illustration of a 3D sound field rendering subroutine.

FIG. 10 illustrates a flowchart of a 3D sound field rendering subroutine 503 for rendering a 3D sound field. The operations of 3D sound field rendering subroutine 503 are intended to be illustrative. In some implementations 3D sound field rendering subroutine 503 may be accomplished with one of more additional operations not described, and/or without one or more of the operations discussed. Additionally, the order in which the operations of 3D sound field rendering subroutine 503 are illustrated in FIG. 10 and described below is not intended to be limiting.

In some implementations, 3D sound field rendering subroutine 503 may be implemented in one or more processing devices (e.g a digital processor, an analog processor, a digital circuit designed to process information, an analog circuit designed to process information, a state machine, and/or other mechanisms for electronically processing information). The one or more processing devices may include one or more devices executing some or all of the operations of 3D sound field rendering subroutine 503 in response to instructions stored electronically on an electronic storage medium. The one or more processing devices may include one or more devices configured through hardware, firmware, and/or software to be specifically designed for execution of one or more of the operations of 3D sound field rendering subroutine 503. The one or more processing devices may be present in auditory augmented reality device 101, client computing device 202, server 204, and/or client computing device 205. 3D sound field rendering subroutine 503 may be performed by a 3D sound field rendering submodule the same as or similar to 3D sound field rendering submodule 115.

At operation 1002 a 3D sound field model may be loaded. The 3D sound field may be the 3D sound field returned by 3D sound field modeling subroutine 502, such as 3D sound field model 800. Operation 1002 may be performed by a 3D sound field rendering submodule the same as or similar to 3D sound field rendering submodule 115.

At operation 1003, the orientation of a user's head may be determined. For the first time that 3D sound field modeling subroutine 502 is run in a game subroutine 307, the orientation of the user's head may be determined in a variety of ways:

a. The user's orientation may be predetermined. For example, at the start of a game, the user may be instructed to stand in a specific location in the building and to look in a specific direction. It may then be assumed that the user followed these instructions and in fact oriented as instructed;

b. If the user is wearing an augmented reality device that is the same or similar to auditory augmented reality device 101, the orientation of the user's head may be determined using magnetometer 117.

c. If the user possess a client computing device 202 with tracking capabilities, such as GPS or a compass, those tracking features may be used to determine the user's orientation.

For iterations of 3D sound field rendering subroutine 503, in which the user's initial orientation was established, the orientation of the user's head may be estimated based on readings from a gyroscope that is the same or similar to gyroscope 118. For example, the user's initial head orientation may be looking due west. If gyroscope 118 detects a clockwise rotation of 90 degrees, the user's new head orientation may be due North. The user's orientation may also be determined using a magnetometer that is the same or similar to magnetometer 117. Operation 1003 may be performed by a 3D sound field rendering submodule the same as or similar to 3D sound field rendering submodule 115.

At operation 1004, a user's head related impulse response functions (HRIRs) may be generated. Rendering a realistic 3D sound field may require the use of a head-related transfer function (HRTF) and/or a head-related impulse response function (HRIR). An HRTF may be a function that characterizes how an ear receives a sound from a point in space. An HRIR may be the fourier transfer of an HRTF, and when convoluted with an arbitrary sound source, may produce a sound that gives a user the perception of the sound coming from a particular location. Most current implementations of 3D sound fields use the same HRIRs for all users. However, given that no two human heads or ears are exactly the same, each person has a unique HRIR for their left ear and a unique HRIR for their right ear. If a demographic information of a user is available, an HRIR that is more accurate than a default HRIR may be used. For example, a 30-year-old male may be expected to have a larger head than a 7-year-old girl and this information may be used in generating more accurate HRIRs. Such demographic data may be obtained from a user's profile, if available. A still more accurate method to generate HRIRs may be to derive them from the actual geometry of a person's head and ears may be mapped to obtain accurate HRIRs. The map of the geometry of the user's head and ears may be obtained from a database, if the user has previously scanned their head, or the user may be prompted to perform a scan of their head, if a suitable scanning device is available. Operation 1004 may be performed by a 3D sound field rendering submodule the same as or similar to 3D sound field rendering submodule 115.

At operation 1005 an HRIR may be executed with respect to an original sound source or a reflected sound source to return a real-time waveform. Given an original sound source or a reflected sound source in a 3D sound field model, an HRIR may be applied to produce a real-time waveform that, when presented to a user, may create the illusion that the original sound source or reflected sound source is coming from a particular location in space. Given that most user's have two ears, a rendering and production of a 3D sound field requires sound to be presented to the user's left and right ears. In the context of 3D sound fields, the differences between the sounds experienced by the left and right ear contribute to the illusion of the sound coming from a particular location. Therefore, it should be appreciated that for any original or reflected sound source, two HRIRs must be executed, one for the left ear and one for the right ear.

Using the example of the haunted house game, which should not be construed as limiting a real-time waveform function representing the spooky voice of a virtual ghost 705 may be present in a 3D sound field model returned by 3D sound field modeling subroutine 502. An HRIR function may take as input:
 a. A real-time waveform function from 3D sound field model 800;
 b. the orientation of the user's head;
 c. the user's location;
 d. the location of the sound source;
 e. and whether the left or right ear is of interest.

The HRIR function may take as input the results from the real-time waveform function. In such a scenario, the real-time waveform function would be executed prior to the execution of the HRIR function. The HRIR function may output a real-time waveform for presentation to the user. Operation 1005 should be repeated for each original sound source and for each reflected sound source present in 3D sound field model 800. Operation 1005 may be performed by a 3D sound field rendering submodule the same as or similar to 3D sound field rendering submodule 115.

At operation 1006 waveforms produced from HRIRs may be summed and output to a user. If only one original or reflected sound source is present in 3D sound field model 800, and thus only one waveform is produced for each ear of the user, those waveforms may be output to the user in the form of sound. Sound may be output to the user by a module that is the same or similar to sound output component 104. Where multiple sound sources are present in 3D sound field model 800, multiple waveforms may be produced for each ear at operation 1005. To present a comprehensible sound field to the user, all waveforms produced for a particular ear may be summed to one waveform and presented to that ear. The processing portion of operation 1006 may be performed by a 3D sound field rendering submodule the same as or similar to 3D sound field rendering submodule 115.

Foot Step Detection Subroutine

Figure 11:
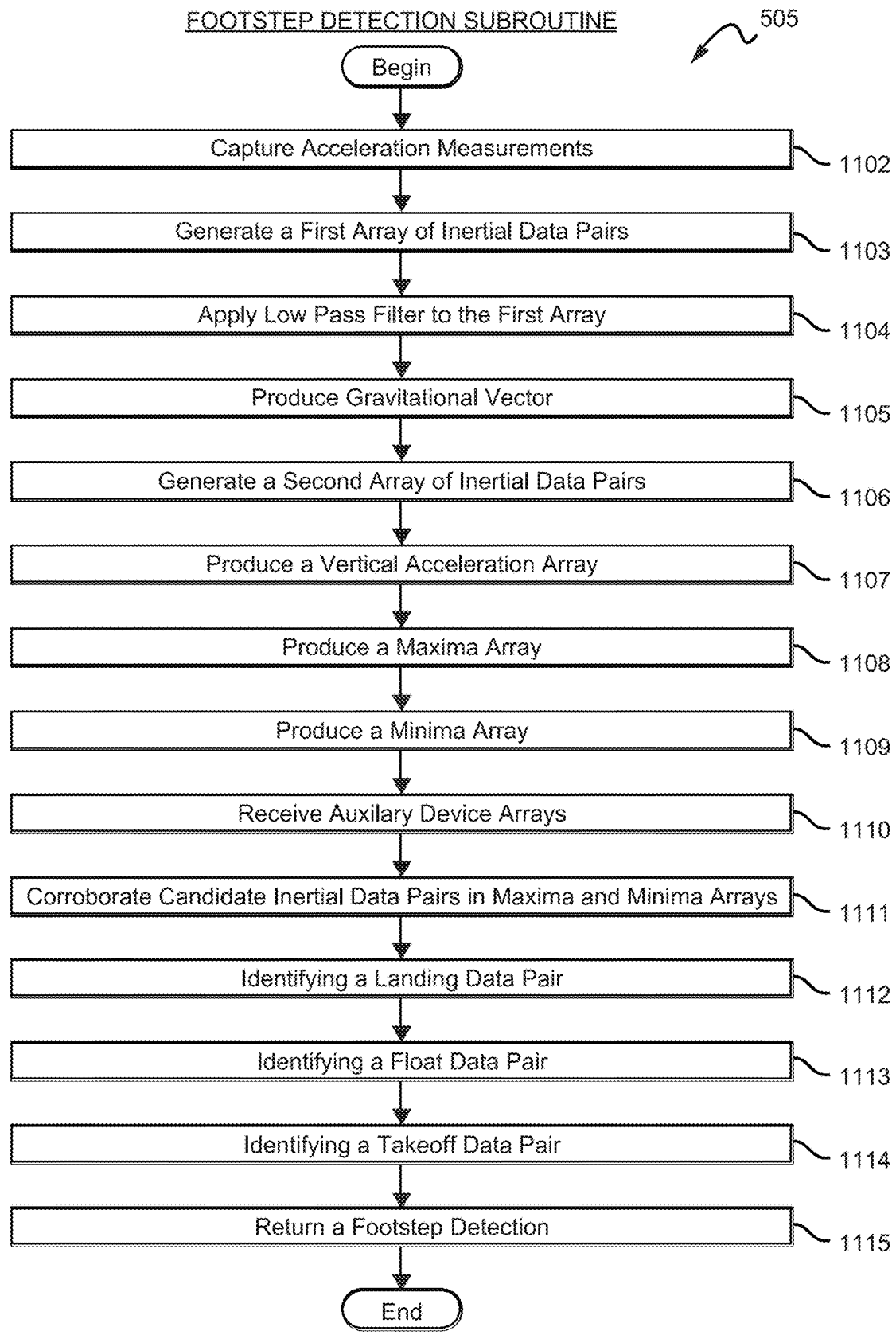
FIG. 11 is a flowchart illustration of a footstep detection subroutine.

FIG. 11 illustrates a flowchart of a footstep detection subroutine 505 for detecting a user's footsteps. The operations of footstep detection subroutine 505 are intended to be illustrative. In some implementations footstep detection subroutine 505 may be accomplished with one of more additional operations not described, and/or without one or more of the operations discussed. Additionally, the order in which the operations of footstep detection subroutine 505 are illustrated in FIG. 11 and described below is not intended to be limiting.

In some implementations, footstep detection subroutine 505 may be implemented in one or more processing devices (e.g a digital processor, an analog processor, a digital circuit designed to process information, an analog circuit designed to process information, a state machine, and/or other mechanisms for electronically processing information). The one or more processing devices may include one or more devices executing some or all of the operations of footstep detection subroutine 505 in response to instructions stored electronically on an electronic storage medium. The one or more processing devices may include one or more devices configured through hardware, firmware, and/or software to be specifically designed for execution of one or more of the operations of footstep detection subroutine 505. The one or more processing devices may be present in auditory augmented reality device 101, client computing device 202, server 204, and/or client computing device 205. Footstep detection subroutine 505 may be performed by a footstep detection submodule the same as or similar to footstep detection submodule 112.

At operation 1102, acceleration measurements of a user may be captured. The 3-axis measurements of the user's acceleration may be captured using an accelerometer that is the same or similar to accelerometer 116. Capturing of the user's acceleration measurements may occur continuously.

At operation 1103 a first array of inertial data pairs may be generated. An inertial data pair may be a 3-axis acceleration measurement, as captured at operation 1102, paired with a timestamp that indicates the time at which the 3-axis acceleration was measured. It may be desirable to limit the inertial data pairs of the first array to only those inertial data pairs captured during a time period that is the lesser of the length of time which the user has been playing the game, or a gravity direction filter duration. As explained more fully below, the inertial data pairs of the first array may be used to produce a gravitational vector. Operation 1103 may be performed by footstep detection submodule 112.

At operation 1104 a low pass frequency filter may be applied to the first array of inertial data pairs. Accelerometers may be subject to relatively high frequency movements that correspond to minor bumps or vibrations. Acceleration measurements from such relatively high frequency movements are generally not helpful in detecting whether or not a user has taken a footstep. It may therefore be desirable to remove relatively high frequency acceleration measurements from data sets in a footstep detection subroutine. The low pass frequency filter may be set to filter out all data with a frequency above the fastest reasonable frequency of a footstep. For example, the low pass frequency filter may be set to 4 Hz. Operation 1104 may be performed by footstep detection submodule 112.

At operation 1105 a gravitational vector may be produced. Footsteps may be detected by characteristic acceleration patterns in the vertical direction. For example, a footstep may be modeled in 3 phases: a takeoff phase, a floating phase, and a landing phase. During the takeoff phase and landing phase, vertical accelerations may be relatively large. During the floating phase, vertical accelerations may be relatively small. A user's footstep may thus be detected by searching for identifiable patterns in vertical acceleration readings. However, an auditory augmented reality device, such as auditory augmented reality device 101, may need to be calibrated to determine the vertical direction, relative to the force of gravity. Given a set of 3-axis acceleration measurements over a sufficient period of time, the direction of gravity may be determined by averaging the acceleration readings to produce a 3-axis average vector. This vector may then be normalized to have a length of 1 and may be referred to as a gravitational vector. The gravity direction filter duration should be long enough to allow for a sufficient data set to be captured for determining the direction of gravity. A gravity direction filter duration may be set as 10 seconds. In at least one embodiment, the acceleration readings of the first inertial array may be averaged to produce a gravitational vector. Operation 1105 may be performed by footstep detection submodule 112.

At operation 1106, a second array of inertial data pairs may be selected from the most recent elements of the first array, to which a low pass filter has already been applied at operation 1104. It may be desirable to limit the inertial data pairs of the second array to only those inertial data pairs captured during a time period that is no greater than the maximum reasonable duration of a footstep. As explained more fully below, the inertial data pairs of the second array may be filtered and manipulated to identify candidate acceleration measurements for phases of a footstep. Thus, limiting the second array to the maximum reasonable duration of a footstep limits the potential confusion that may be caused by the acceleration measurements produced by a relatively large number of footsteps. Operation 1106 may be performed by footstep detection submodule 112.

At operation 1107, a vertical acceleration array may be produced. As noted above, a footstep may be detected based on patterns in a user's vertical acceleration. By taking the dot product of each element of the second array with the gravitational vector, a vertical acceleration array may be produced. The gravitational array may comprise the vertical components of the inertial data pairs of the second array and the associated timestamps. Thus, the vertical acceleration array may represent the user's vertical acceleration measurements for the time period of the second array. Operation 1107 may be performed by footstep detection submodule 112.

At operation 1108 a maxima array may be produced. The purpose of producing a maxima array may be to attempt to identify maxima candidate inertial data pairs that may be associated with the takeoff or landing phases of a footstep. A maxima array may comprise a subset of inertial data pairs of the gravitational array. Only inertial data pairs that satisfy both of the following criteria may be added to the maxima array:

a. the candidate maxima inertial data pair must possess an acceleration measurement that is greater than a push threshold. The push threshold may approximate the minimum reasonable acceleration measurement that may be associated with the takeoff or landing phase of a footstep.

b. the candidate maxima inertial data pair must possess an acceleration measurement that is greater than the acceleration measurements of all other inertial pairs captured within a specified time period of the candidate inertial pair. For example, the specified time period may be 0.125 seconds, or half the length of time of the fastest reasonable footstep. In this example, a candidate inertial data pair must possess a greater acceleration measurement than all inertial data pairs that were captured up to 0.125 seconds before the candidate inertial data pair and up to 0.125 seconds after the inertial data pair.

Operation 1108 may be performed by footstep detection submodule 112.

At operation 1109 a minima array may be produced. The purpose of producing a minima array may be to attempt to identify minima candidate inertial data pairs that may be associated with the float phase of a footstep. A minima array may consist of a subset of inertial data pairs of the gravitational array. Only inertial data pairs that satisfy both of the following criteria may be added to the minima array:

a. the candidate minima inertial data pair must possess an acceleration measurement that is less than a float threshold. The float threshold may approximate the maximum reasonable acceleration measurement that may be associated with the float phase of a footstep.

b. the candidate minima inertial data pair must possess an acceleration measurement that is less than the acceleration measurements of all other inertial data pairs captured within a specified time period of the candidate inertial pair. For example, the specified time period may be 0.125 seconds, or half the length of time of the fastest reasonable footstep. In this example, a candidate inertial data pair must possess a smaller acceleration measurement than all inertial data pairs that were captured up to 0.125 seconds before the candidate inertial data pair and up to 0.125 seconds after the inertial data pair.

Operation 1109 may be performed by footstep detection submodule 112.

At operation 1110, auxiliary device arrays may be received. A user engaged in an auditory augmented reality experience may possess more than one experience computing device. For example, a user may wear auditory augmented reality device 101 on the user's head and have client computing device 202, in the form of a smartphone, in the user's pocket. Client computing device 202 may possess an IMU and may be capable of capturing acceleration readings in the same or a similar manner as auditory augmented reality device 101. Operations the same as or similar to operations 1103 through 1109 may be performed on acceleration measurements captured by an auxiliary computing device in order to produce an auxiliary device maxima array and auxiliary device minima array. The auditory augmented reality device 101 may be referred to as the master device.

At operation 1111, candidate inertial data pairs in the maxima and minima arrays of the master device may be corroborated. As the master device and the auxiliary devices are detachable affixed to the user, or in the user's pocket, both devices should experience vertical acceleration readings associated with footsteps at substantially the same time. Therefore, the candidate inertial data pairs of maxima and minima arrays of the master device may be corroborated by searching the auxiliary maxima and minima arrays for inertial data pairs within a certain time period of the candidate inertial data pairs of the master device. For example, a candidate maxima inertial data pair of the master device may have a time stamp of 1.3 seconds. To corroborate this candidate maxima inertial data pair, it may be required that an inertial data pair in the auxiliary maxima array exists with a timestamp between 1.1 to 1.5 seconds. In other words, for this example, there must be a corroborating auxiliary inertial data pair within 0.2 seconds of the candidate inertial data pair. In the event that auxiliary corroboration is unsuccessful, the candidate inertial data pair may be removed from the master device maxima and minima arrays. Unsuccessful auxiliary corroboration may indicate that the candidate inertial data pair represents either noise or a spurious motion that is not a footstep. If the user does not possess an auxiliary computing device, operations 1110 and 1111 may be skipped. If a user has multiple auxiliary computing devices, operation 1110 and 1111 may be looped for each device. For the operations below that follow, references to maxima and minima arrays are references to the maxima and minima arrays of the master device, as opposed to the auxiliary device.

At operation 1112 a candidate inertial data pair in the maxima array may be identified as a candidate for the landing phase of a footstep. This inertial data pair may be referred to as a candidate landing inertial data pair. The inertial data pair in the maxima array with the most recent timestamp may be identified as the candidate landing inertial data pair. For example, if timestamps of 4.7, 5 seconds, and 5.8 seconds existed in the maxima array, the inertial data pair associated with the timestamps of 5.8 seconds would be identified as the candidate landing data pair. For the purposes of these examples, a smaller timestamp indicates that an inertial data pair was captured further in the past, and the largest timestamp indicates that the inertial data pair was captured closest to the present.

At operation 1113, a candidate inertial data pair in the minima array may be identified as a candidate for the float phase of a footstep. This inertial data pair may be referred to as a candidate float data pair. The candidate float inertial data pair may be the inertial data pair in the minima array with the greatest timestamp of all those inertial data pairs in the minima array with timestamps that are less than the timestamp of the candidate landing inertial data pair. For example, if the minima array contains candidate inertial data pairs with timestamps of 5.3 seconds, 5.5 seconds, 6 seconds, and 6.3 seconds, and the candidate for the landing phase is timestamped 5.8 seconds, then 5.5 seconds will be the candidate float inertial data pair.

At operation 1114, a candidate inertial data pair in the maxima array may be identified as a candidate for the takeoff phase of a footstep. This inertial data pair may be referred to as a candidate takeoff inertial data pair. The candidate takeoff inertial data pair may be the inertial data pair in the maxima array with the greatest timestamp of all those inertial data pairs in the maxima array with timestamps that are less than the timestamp of the candidate float inertial data pair. For example, if the maxima array contains candidate inertial data pairs with timestamps of 4.7 seconds, 5 seconds, and 5.8 seconds, and the candidate for the float phase is timestamped 5.5 seconds, then 5 seconds will be the candidate takeoff data pair.

At operation 1115, a footstep detection may be returned to game subroutine 307. Included in the returned data may be the timestamp of the footstep landing phase. A footstep detection will only be returned if a candidate landing float, and takeoff phase have been successfully identified. Otherwise, footstep detection subroutine 505 will return that no footstep has been detected.

Pedestrian Dead-Reckoning Subroutine

Pedestrian dead-reckoning may be a technique by which a pedestrian's location may be estimated as the pedestrian walks. In traditional pedestrian dead-reckoning a pedestrian's initial location and orientation is known. Each time the pedestrian takes a footstep, a vector is added to the pedestrian's position. The vector is traditionally the length of a predetermined footstep length and the direction of the vector is derived from compass readings. While pedestrian dead-reckoning has been used in more modern applications such as fitness pedometers, it is generally not used to track the location of a user in augmented reality applications. Because pedestrian dead-reckoning relies on a number of assumptions, including that footsteps are of uniform length, estimations of a user's position and orientation after a few iterations of pedestrian dead-reckoning may be inaccurate relative to other means of tracking Because many visual augmented reality applications display virtual images anchored to real physical objects, pedestrian dead-reckoning may not be a passable method of user tracking in such applications. If the user's location and/or orientation are not relatively accurate, virtual images anchored to real objects will not appear realistic.

However, in an auditory augmented reality application that does not incorporate visual augmentations, pedestrian dead-reckoning may be a passable method of user tracking. While a human's eye may be able to pinpoint a single dead pixel on a television screen, it is unlikely that a human would notice relatively minor variations in the location of a sound source. Thus, a passable auditory augmented reality scene may be rendered and presented to a user, despite the inherent inaccuracies of pedestrian dead-reckoning as a method of establishing the user's location.

Moreover, an auditory augmented reality device that relies on pedestrian-dead reckoning to track a user may be significantly smaller, lighter, and less expensive than one that relies on visual tracking GPS, or other means of tracking.

Figure 12:
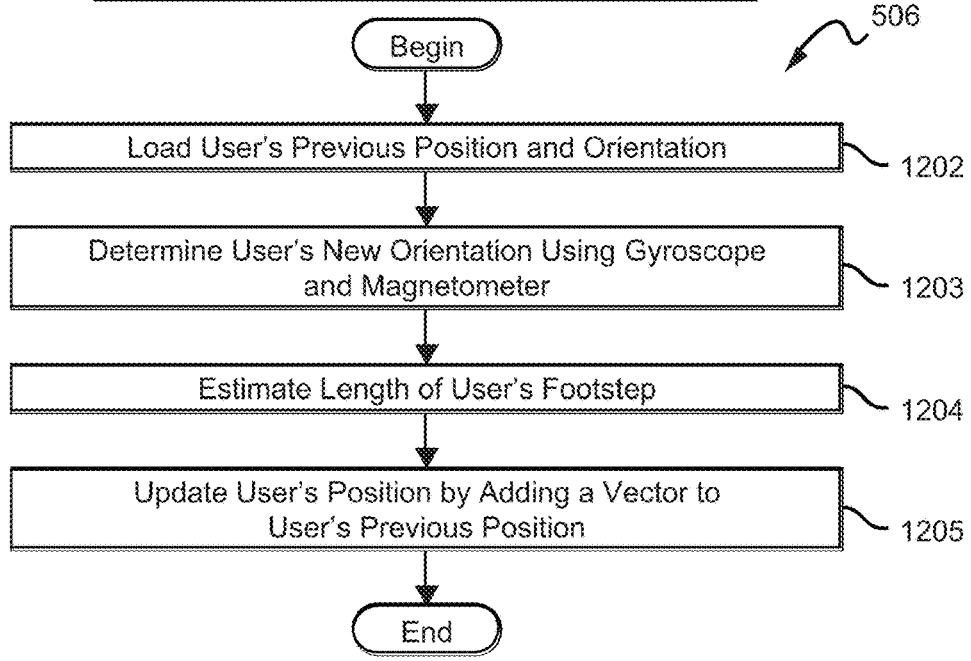
FIG. 12 is a flowchart illustration of a pedestrian dead-reckoning subroutine.

FIG. 12 illustrates a flowchart of a pedestrian dead-reckoning subroutine 506 for estimating the position and orientation of a user. The operations of pedestrian dead-reckoning subroutine 506 are intended to be illustrative. In some implementations pedestrian dead-reckoning subroutine 506 may be accomplished with one of more additional operations not described, and/or without one or more of the operations discussed. Additionally, the order in which the operations of pedestrian dead-reckoning subroutine 506 are illustrated in FIG. 12 and described below is not intended to be limiting.

In some implementations, pedestrian dead-reckoning subroutine 506 may be implemented in one or more processing devices (e.g a digital processor, an analog processor, a digital circuit designed to process information, an analog circuit designed to process information, a state machine, and/or other mechanisms for electronically processing information). The one or more processing devices may include one or more devices executing some or all of the operations of pedestrian dead-reckoning subroutine 506 in response to instructions stored electronically on an electronic storage medium. The one or more processing devices may include one or more devices configured through hardware, firmware, and/or software to be specifically designed for execution of one or more of the operations of pedestrian dead-reckoning subroutine 506. The one or more processing devices may be present in auditory augmented reality device 101, client computing device 202, server 204, and/or client computing device 205. Pedestrian dead-reckoning 506 may be performed by a pedestrian dead-reckoning submodule the same as or similar to pedestrian dead-reckoning submodule 112.

At operation 1202 a user's previous position and orientation may be loaded. Pedestrian dead-reckoning subroutine may be triggered when footstep detection subroutine 505 has been executed and footstep has been detected. During a first iteration of pedestrian dead-reckoning subroutine 506, the user's previous position may be predetermined. For example, at the start of a game, the user may be instructed to stand in a specific location in the building and to look in a specific direction. It may then be assumed that the user followed these instructions and in fact was in the predetermined position, prior to taking the detected footstep. Alternatively, during the first iteration of the pedestrian dead-reckoning subroutine 506, the user's position may be established with any number of user tracking techniques, such as GPS. If the user is wearing auditory augmented reality device 101, which does not have a GPS module or other suitable module that may facilitate establishing the user's initial position, but the user has a client computing device 202 in the form of a smartphone, the user's smartphone may relay information to facilitate establishing the user's initial position.

At operation 1203 the user's new orientation may be determined using gyroscope 118 and magnetometer 117. If the user's previous orientation with respect to the earths magnetic field is known, the user's new orientation may be determined using magnetometer 117. Alternatively, given that the user's previous orientation is known, the user's new orientation may be estimated based on changes in orientation as measured by gyroscope 118. A user's new orientation should be estimated at the point in time associated with the timestamp returned from footstep detection subroutine 505. Gyroscope 118 and magnetometer 117 may be used in concert to estimate the new orientation of the user.

At operation 1204 the length of the user's footstep may be estimated. The length of the user's footstep may be estimated using data from a profile of the user. Demographic information about a user such as age, height, and weight may be used to estimate a user's footstep length. Alternatively, a user's actual footstep length may be input by the user or determined through a calibration process. This footstep length may be constant for each iteration of operation 1204. Alternatively, different footstep lengths may be attributed to the right and left footsteps.

At operation 1205, a user's position may be updated by adding a vector to the user's previous position. The vector that may be added may ideally be a vector that is the length of the user's estimated footstep.

Figure 13:
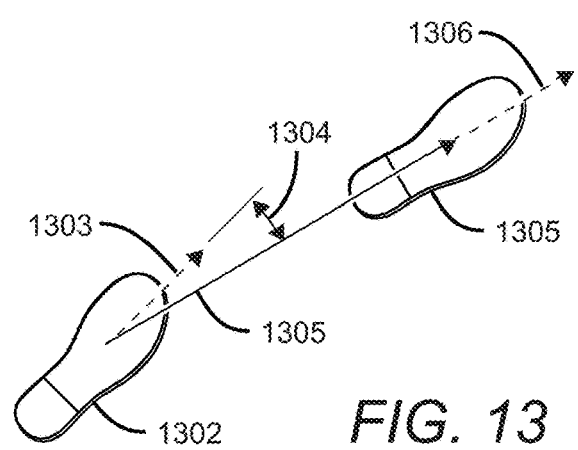
FIG. 13 is a diagram illustration of an example of pedestrian dead-reckoning.

FIG. 13 illustrates an example of one iteration of a pedestrian dead-reckoning subroutine 506.

A first footprint 1302 represents the user's previous location and orientation, as may loaded at operation 1202. Similarly, dotted arrow 1303 represents a user's previous orientation. A change in the user's orientation, between the time the previous position was estimated and the time that a footstep is detected by footstep detection subroutine 505, is represented by angle 1304. Vector 1305 is added to the user's previous position 1302, to estimate the user's up dated position 1305. During a subsequent iteration of the pedestrian dead-reckoning subroutine 506, the user's previous orientation may be represented by dotted arrow 1306.

Historical Pattern Map

Figure 14:
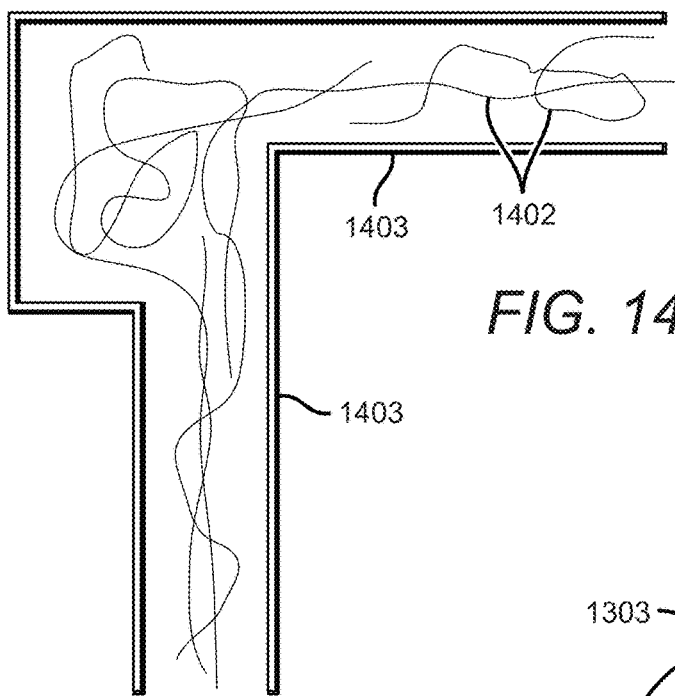
FIG. 14 is a diagram illustration of a historical pattern map.

FIG. 14 illustrates an example of a historical pattern map of an asymmetrical hallway. As one or more users move throughout a physical environment over time, the movements of the user(s) may be tracked. With enough tracking history, patterns may emerge that suggest the locations of physical walls. In FIG. 14. the routes 1402 of user(s) are used to estimate the location of walls 1403 of an asymmetrical hallway. As shown in FIG. 14, when the routes 1402 are overlaid (by aligning them orientationally using magnetometer data and/or compass data, and aligning them positionally using GPS, GLONASS, Galileo, BeiDou, other GNSS and/or using visual tracking or using other means of tracking), then the sum total of the overlaid routes 1402 may indicate that certain parts of the environment are always avoided. This is a strong signal that these parts of the environment may contain walls or obstacles, such as walls 1403. The prediction of walls and obstacles locations can be further enhanced through prior knowledge and/or assumptions such as:

a. It may be reasonable to assume that users almost always maintain a minimum clearance from walls. Thus, the estimated wall or obstacle locations should be pulled back from the paths, to leave a reasonable gap.

b. It may be reasonable to assume that man-made walls are typically at right angles to each other.

c. It may be reasonable to assume that obstacles and walls will be of a certain minimum size. This assumption is important in order to avoid numerous false positives. Without this assumption, the algorithm might place numerous tiny obstacles throughout the environment in places that are not really obstructed, but that users have simply never traversed due to chance. Also, this assumption is somewhat of a tautology, in that any obstacles below a reasonable minimum size may have small acoustic effects and be too small to be worth trying to detect.

One technique for overlaying a historical dataset of paths (in addition to GPS, GLONASS, Galileo, BeiDou and/or other GNSS, and in addition to visual tracking) may be a simpler approach that does not strictly depend on either of these inputs (although such inputs would certainly help). The technique is to overlay the paths through trial and error with the goal of overlaying them in such a way as to make the paths cover as little ground area as possible. This assumption may be a good one for the simple reason that real estate costs money, and thus any users home or any professional venue will have limited square footage due to budgetary constraints. When this technique is properly applied, it will result in similar shapes being overlaid on top of each other. For example, a path shaped like V should be overlapped with one or the other half of a path shaped like W, and a path shaped like L should be overlapped with the bottom left corner of a path shaped like D. This overlapping of similar shapes will happen automatically as the algorithm seeks to minimize the total square footage covered by paths.

Especially in outdoor environments due to the movement of vehicles, but also in indoor environments due to the occasional movement of furniture, it may be desirable to discard older path data from a sufficiently long time ago, in order to avoid the risk of using data that is now outdated.

Efficient Tracking of Smart Glasses

An auditory augmented reality experience may be combined with a virtual augmented reality experience for a more immersive augmented reality experience. However, current HMDs that provide an interactive auditory augmented reality experience in addition to a visual augmented reality experience are relatively bulky. By uncoupling the audio output component from the HMD, the volume and weight of the HMD may be significantly reduced. As noted above, the volume and weight of the HMD may be further reduced by relying on low power and low computational load methods of tracking the user.

Figure 15A:
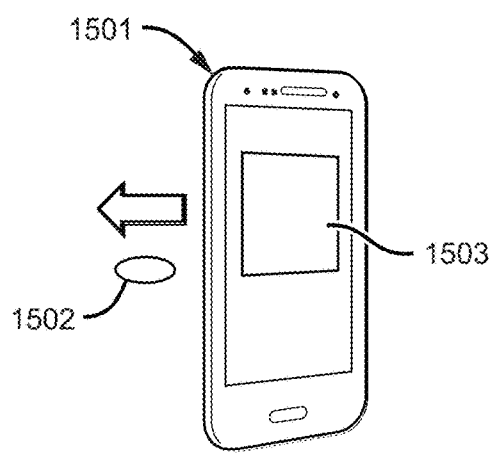
FIG. 15a is a diagram illustration of a of a known image displayed on a smartphone.

FIG. 15a is a diagram illustrating the display of a known image on a smartphone. In FIG. 15a, smartphone 1501 may have an absolute orientation 1502. Smartphone 1501 may display a known image 1503.

Figure 15B:
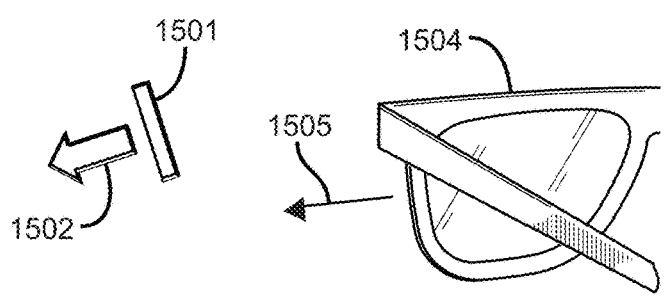
FIG. 15b is a diagram illustration of the spatial relationship between a smartphone and a pair of smartglasses.

FIG. 15b is a diagram illustrating the spatial relationship between a smartphone and a pair of smartglasses. In FIG. 15b, smartphone 1501 may have absolute orientation 1502. Smartglasses 1504 may have absolute orientation 1505.

Figure 16:
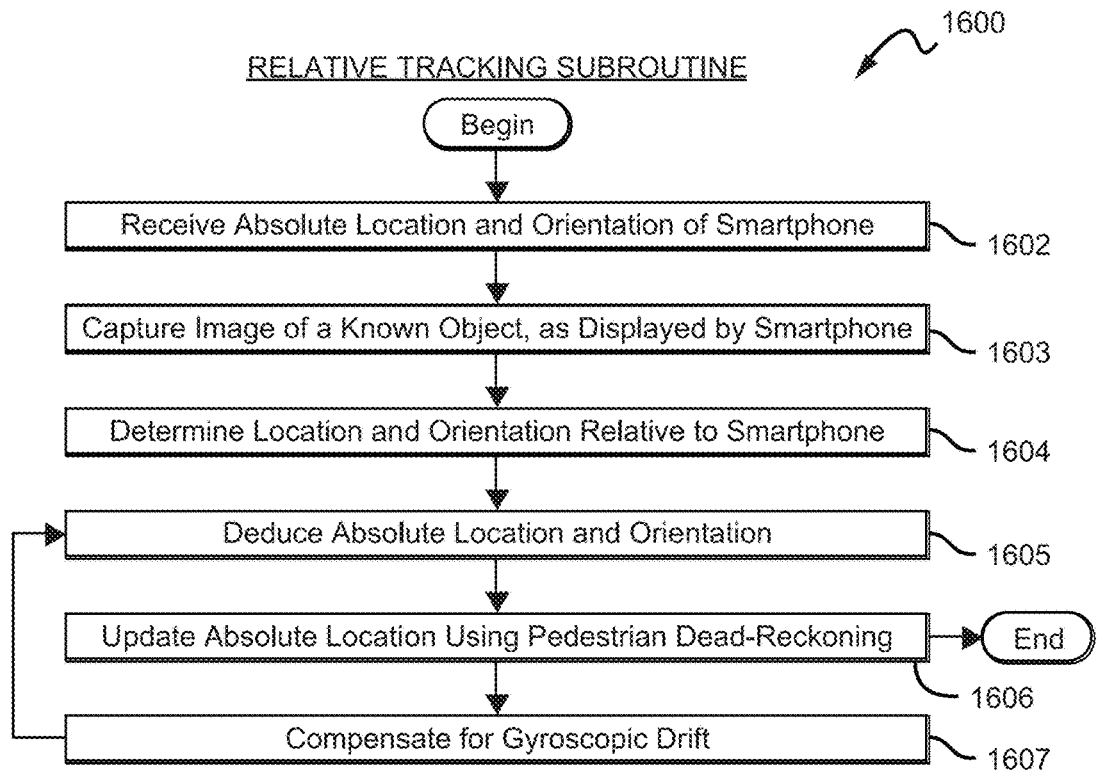
FIG. 16 is a flowchart illustration of a relative tracking subroutine.

FIG. 16 is an illustration of a relative tracking subroutine 1600 for tracking a user that possesses both a smartphone 1501 and smartglasses 1504. The operations of relative tracking subroutine 1600 are intended to be illustrative. In some implementations, relative tracking subroutine 1600 may be accomplished with one of more additional operations not described, and/or without one or more of the operations discussed. Additionally, the order in which the operations of relative tracking subroutine 1600 are illustrated in FIG. 16 and described below is not intended to be limiting.

In some implementations, relative tracking subroutine 1600 may be implemented in one or more processing devices (e.g a digital processor, an analog processor, a digital circuit designed to process information, an analog circuit designed to process information, a state machine, and/or other mechanisms for electronically processing information). The one or more processing devices may include one or more devices executing some or all of the operations of relative tracking subroutine 1600 in response to instructions stored electronically on an electronic storage medium. The one or more processing devices may include one or more devices configured through hardware, firmware, and/or software to be specifically designed for execution of one or more of the operations of relative tracking subroutine 1600. The one or more processing devices may be present in smartphone 1501, and/or smartglasses 1504.

Figure 17:
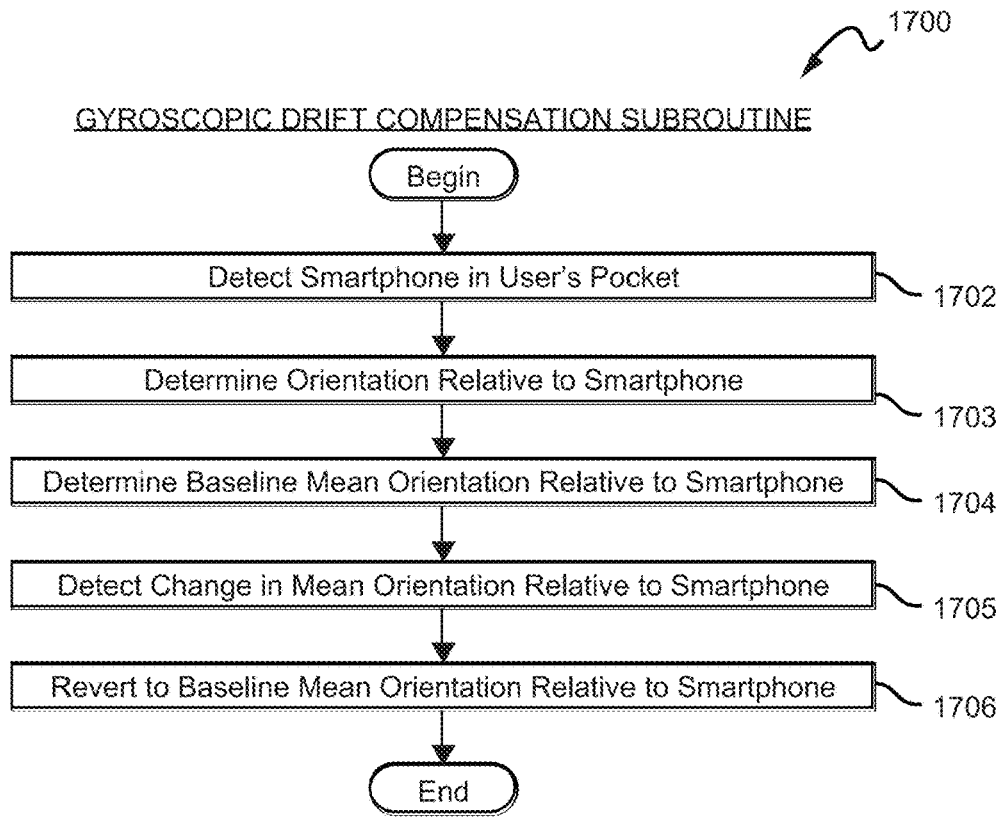
FIG. 17 is a flowchart illustration of a gyroscopic drift compensation subroutine.

The smartphone 1501 in FIG. 16, FIG. 15, and FIG. 17 is used for exemplary purposes. Other auxiliary computing devices may implement the operations implemented by smartphone 1501. The client computing device 202 may implement the operations implemented by smartphone 1501. The device is auxiliary in the sense that it is separate from the augmented reality device that presents the augmented reality scene to the user. Similarly, the smartglasses 1504 in FIG. 16, FIG. 15, and FIG. 17 are used for exemplary purposes. Other augmented reality devices may implement the operations implemented by smartglasses 1504. An augmented reality device may comprise at least one or more visual sensors, one or more displays, a positional sensing component, and a computing module.

At operation 1602 an absolute location and orientation 1502 of a smartphone may be received from the smartphone 1501. Absolute location and orientation refer to a device's location and orientation with respect to the earth or with respect to a real physical space. On the other hand, relative location and orientation refer to a device's location and orientation relative to another device. Smartphone 1501 may determine its own absolute orientation 1502 using a magnetometer. The smartphone may determine its own absolute location using GPS. Various other means of determining absolute location and orientation may be available to the smartphone. Smartglasses 1504 may receive the absolute location and orientation 1502 of the smartphone via a wireless or wired connection.

At operation 1603, known image 1503, as displayed by smartphone 1501, may be captured. An example of a known image may be a particular QR code, or other 2-dimensional image that is known to both smartphone 1501 and smartglasses 1504. Assuming that the display of the smartphone 1501 is within the field of view of smartglasses 1504, smartglasses 1504 may capture an image of known image 1503, as displayed by smartphone 1501.

At operation 1604, the relative location and orientation of smartglasses 1504, relative smartphone 1501, may be determined. Smartglasses 1504 may compare the version of known image 1503 smartglasses 1504 captured from the display of smartphone 1501 to a platonic version of known image 1503, stored in memory. By comparing the two versions of known image 1503, the location and orientation of the displayed version of known image 1503 may be determined, relative to the location and orientation of the smartglasses 1504. The relative location and orientation of smartglasses 1504 with respect to smartphone 1501 may then be determined, given that the known image 1503 may be displayed on a particular surface of smartphone 1501.

At operation 1605, the absolute location and orientation 1505 of smartglasses 1504 may be deduced. The absolute location and orientation 1502 of smartphone 1501 may already be known, and transmitted to smartglasses 1504, as discussed above. Moreover, the relative location and orientation of smartglasses 1504 with respect to smartphone 1501 may already be known, as discussed above. Thus, the absolute location and orientation 1505 of smartglasses 1504 may be deduced.

At operation 1606, the absolute location and orientation 1505 of smartglasses 1504 may be updated using pedestrian dead-reckoning. Methods that are the same as or similar to footstep detection subroutine 505 and pedestrian dead-reckoning subroutine 506 may be implemented to detect a user's footstep and up date the absolute location and orientation 1505 of the smartglasses 1504. Operation 1606 may be repeated for each footstep taken by a user, until the subroutine is completed. Periodically, it may be desirable to implement methods to compensate for gyroscopic drift.

At operation 1607, gyroscopic drift may be compensated for, as discussed more fully below with respect to FIG. 17. Relative tracking subroutine 1600 may then loop back to operation 1605.

FIG. 17 is a flowchart for a gyroscopic drift subroutine for tracking a user that possesses both a smartphone 1501 and smartglasses 1504. The operations of gyroscopic drift subroutine 1700 are intended to be illustrative. In some implementations, gyroscopic drift subroutine 1700 may be accomplished with one of more additional operations not described, and/or without one or more of the operations discussed. Additionally, the order in which the operations of gyroscopic drift subroutine 1700 are illustrated in FIG. 17 and described below is not intended to be limiting.

In some implementations, gyroscopic drift subroutine 1700 may be implemented in one or more processing devices (e.g. a digital processor, an analog processor, a digital circuit designed to process information, an analog circuit designed to process information, a state machine, and/or other mechanisms for electronically processing information). The one or more processing devices may include one or more devices executing some or all of the operations of gyroscopic drift subroutine 1700 in response to instructions stored electronically on an electronic storage medium. The one or more processing devices may include one or more devices configured through hardware, firmware, and/or software to be specifically designed for execution of one or more of the operations of gyroscopic drift subroutine 1700. The one or more processing devices may be present in smartphone 1501, and/or smartglasses 1504.

At operation 1702, smartphone 1501 may be detected as being in a user's pocket. Many modern smartphones are able to detect when the smartphone enters the user's pocket. This may be accomplished by monitoring the smartphone's one or more cameras, ambient light sensors, and/or proximity sensors. Once smartphone 1501 has detected that it is in a user's pocket, it may further determine its own absolute orientation.

At operation 1703, the orientation of smartglasses 1504 relative to smartphone 1501 may be determined. The absolute orientation of smartglasses may be known, as deduced at operation 1605 during a first or later iteration of relative tracking subroutine 1600. The absolute orientation of smartphone 1501 may also be known as determined at operation 1702. Therefore, the relative orientation between the two devices may be deduced. The reader may note that the relative orientation determined at operation 1703 will typically be different than the relative orientation determined at operation 1604, at least in part because the smartphone has been moved from in front of the user to the user's pocket.

At operation 1704, a relative baseline mean orientation between smartglasses 1504 and smartphone 1501 may be determined. Two assumptions may be relevant to this process. The first assumption may be that a smartphone in a user's pocket may maintain relatively constant mean orientation with respect to the user's torso over a long enough period of time. The second assumption may be that a pair of smartglasses on a user's head may maintain a relatively constant mean orientation with respect to the user's torso over a long enough period of time. Therefore, the mean relative orientation between the smartphone and smart glasses over a long enough period of time should also remain relatively constant. An example of such a length of time may be 10 seconds. The baseline mean orientation is the relative orientation between the two devices taken over a sufficiently long period of time.

At operation 1705, a change in the mean orientation of smartglasses 1504 relative to smartphone 1501 may be detected. As discussed with respect to operation 1704, it may be assumed that the mean relative orientation between a smartphone in a user's pocket and smartglasses worn on a user's head may remain relatively constant over a long enough period of time. If, over a relatively long period of time, the relative orientation between the smartphone and the user has substantially changed, it may be assumed that this change is due to gyroscopic drift, as opposed to an actual change in the relative baseline mean orientation between the two devices.

At operation 1706, the gyroscope of smartglasses 1504 may be recalibrated to revert to the relative baseline mean orientation, as determined at operation 1704. Reverting to the baseline mean orientation may result in compensating for gyroscopic drift.

While the discussions of relative tracking subroutine 1600 and gyroscopic drift compensation subroutine 1700 refer to a smartphone and smartglasses, numerous other computing devices may be used to perform the methods discussed therein. Moreover, the methods discussed with respect to FIGS. 16 and 17 may be performed, in part, on an auditory augmented reality device that is the same or similar to auditory augmented reality device 101. As noted in earlier discussions, the absolute location and orientation of auditory augmented reality device 101 may be established, without assistance from another device, by prompting a user to stand in a particular location and look in a particular direction. In such a scenario, the methods of FIG. 17 may be performed, substituting auditory augmented reality device 101 for smartglasses 1504, again assuming that smartphone 1501 is capable of determining its own absolute location. With respect to the methods discussed with respect to FIG. 16, smartphone 1501 may be substituted for a computing device that is capable of at least establishing its own absolute location and orientation and displaying a known image.

SCOPE

Although the present technology has been described in detail for the purpose of illustration based on what is currently considered to be the most practical and preferred implementations, it is to be understood that such detail is solely for that purpose and that the technology is not limited to the disclosed implementations that are within the spirit and scope of the appended claims. For example, it is to be understood that the present technology contemplates that, to the extent possible, one or more features of any implementation can be combined with one or more features of any other implementation.

The disclosure sets forth various examples of computer applications that may benefit from the disclosed systems and methods. However, many other computer applications may benefit from the disclosed systems and methods. Accordingly, the scope should be determined not by the embodiments illustrated, but by the appended claims and their legal equivalents.

What is claimed is:

1. A computer implemented method for detecting a user's footstep, the method comprising:
   capturing a plurality of acceleration measurements using an accelerometer;
   generating a first array of inertial data pairs;
     wherein each of the inertial data pairs of the first array comprises:
       an acceleration measurement captured using the accelerometer; and
       a timestamp;
   applying a low pass frequency filter to the first array;
   averaging and normalizing the acceleration readings of the first array to produce a gravitational vector;
   generating a second array of inertial data pairs;
     wherein the second array of inertial data pairs comprises one or more of the inertial data pairs of the first array;

producing a vertical acceleration array of inertial data pairs;
  wherein each inertial data pair of the vertical acceleration array comprises:
    the vertical acceleration component of one of the inertial data pair of the second array; and
    the timestamp associated with the inertial data pair of the second array;
producing a maxima array of maxima candidate inertial data pairs comprising one or more inertial data pairs of the vertical acceleration array;
  wherein each maxima candidate inertial data pair of the maxima array satisfies the following conditions:
    the acceleration measurement of the maxima candidate inertial data pair is greater than a push threshold; and
    the acceleration measurement of the maxima candidate inertial data pair is greater than the acceleration measurements of all other inertial data pairs of the vertical acceleration array that were captured within a first period of time of the capturing of the maxima candidate data pair;
producing a minima array of minima candidate inertial data pairs comprising one or more inertial data pairs of the vertical acceleration array;
  wherein each minima candidate inertial data pair of the minima array satisfies the following conditions:
    the acceleration measurement of the minima candidate inertial data pair is less than a float threshold; and
    the acceleration measurement of the minima candidate inertial data pair is less than the acceleration measurements of all other inertial data pairs of the vertical acceleration array that were captured within a second period of time of the capturing of the minima candidate data pair;
receiving one or more auxiliary device arrays;
  wherein each of the one or more auxiliary device arrays comprises an auxiliary device maxima array and an auxiliary device minima array;
corroborating maxima candidate inertial data pairs and minima candidate inertial data pairs with the data pairs of the one or more auxiliary device maxima arrays and the one or more auxiliary device minima arrays;
identifying a candidate landing inertial data pair;
  wherein the candidate landing inertial data pair is the inertial data pair in the maxima array with the greatest timestamp;
identifying a candidate float inertial data pair;
  wherein the candidate float inertial data pair is the inertial data pair in the minima array with the greatest timestamp of all those inertial data pairs in the minima array with timestamps that are less than the timestamp of the candidate landing inertial data pair; and
identifying a candidate takeoff inertial data pair;
  wherein the candidate takeoff inertial data pair is the inertial data pair in the maxima array with the greatest timestamp of all those inertial data pairs in the maxima array with timestamps that are less than the timestamp of the candidate float inertial data pair.

2. The method of claim 1 wherein the first array comprises inertial data pairs captured during a third period of time; and wherein the third period of time is the lesser of the length of time which the user has been playing a game or a gravity direction filter duration.

3. The method of claim 1 wherein the vertical acceleration component of the inertial data pair is determined by taking the dot product of the acceleration measurement of the inertial data pair with the gravitational vector.

4. A computer implemented method for facilitating an interactive auditory augmented reality experience for a user, the method comprising:
  loading a map of a physical space;
  joining one or more users into an auditory augmented reality game session;
  starting a game clock; seeding a random number generator;
  loading one or more sound files;
  determining a first position and orientation of the user;
  modeling a first 3D sound field;
    wherein the modeling of the first 3D sound field comprises populating the map with one or more reflected sound sources;
    wherein the one or more reflected sound sources of the first 3D sound field include only those reflected sound sources within a predetermined radius of the first position of the user;
  rendering the first 3D sound field;
  detecting a footstep of the user;
  determining a second position and orientation of the user;
  modeling a second 3D sound field;
    wherein the modeling of the second 3D sound field comprises populating the map with one or more reflected sound sources;
    wherein the one or more reflected sound sources of the second 3D sound field include only those reflected sound sources within a predetermined radius of the second position of the user; and
  rendering the second 3D sound field.

5. The method of claim 4 wherein the map of the physical space is loaded by guiding a user through a SLAM process to create a map of the physical space.

6. The method of claim 4 wherein the second position and orientation of the user are determined using pedestrian dead reckoning.

7. The method of claim 4 wherein the footstep of the user is detected using a method comprising:
  capturing a plurality of acceleration measurements using an accelerometer;
  generating a first array of inertial data pairs;
    wherein each of the inertial data pairs of the first array comprises:
      an acceleration measurement captured using the accelerometer; and
      a timestamp;
  applying a low pass frequency filter to the first array;
  averaging and normalizing the acceleration readings of the first array to produce a gravitational vector;
  generating a second array of inertial data pairs;
    wherein the second array of inertial data pairs comprises one or more of the inertial data pairs of the first array;
  producing a vertical acceleration array of inertial data pairs;
    wherein each inertial data pair of the vertical acceleration array comprises:
      the vertical acceleration component of one of the inertial data pair of the second array; and
      the timestamp associated with the inertial data pair of the second array;

producing a maxima array of maxima candidate inertial data pairs comprising one or more inertial data pairs of the vertical acceleration array;
  wherein each maxima candidate inertial data pair of the maxima array satisfies the following conditions:
    the acceleration measurement of the maxima candidate inertial data pair is greater than a push threshold; and
    the acceleration measurement of the maxima candidate inertial data pair is greater than the acceleration measurements of all other inertial data pairs of the vertical acceleration array that were captured within a first period of time of the capturing of the maxima candidate data pair;
producing a minima array of minima candidate inertial data pairs comprising one or more inertial data pairs of the vertical acceleration array;
  wherein each minima candidate inertial data pair of the minima array satisfies the following conditions:
    the acceleration measurement of the minima candidate inertial data pair is less than a float threshold; and
    the acceleration measurement of the minima candidate inertial data pair is less than the acceleration measurements of all other inertial data pairs of the vertical acceleration array that were captured within a second period of time of the capturing of the minima candidate data pair;
receiving one or more auxiliary device arrays;
  wherein each of the one or more auxiliary device arrays comprises an auxiliary device maxima array and an auxiliary device minima array;
corroborating maxima candidate inertial data pairs and minima candidate inertial data pairs with the data pairs of the one or more auxiliary device maxima arrays and the one or more auxiliary device minima arrays;
identifying a candidate landing inertial data pair;
  wherein the candidate landing inertial data pair is the inertial data pair in the maxima array with the greatest timestamp;
identifying a candidate float inertial data pair;
  wherein the candidate float inertial data pair is the inertial data pair in the minima array with the greatest timestamp of all those inertial data pairs in the minima array with timestamps that are less than the timestamp of the candidate landing inertial data pair;
identifying a candidate takeoff inertial data pair;
  wherein the candidate takeoff inertial data pair is the inertial data pair in the maxima array with the greatest timestamp of all those inertial data pairs in the maxima array with timestamps that are less than the timestamp of the candidate float inertial data pair; and
returning that a footstep has been detected.

8. The method of claim 4 wherein the second position and orientation of the user are determined using a method comprising:
loading the first position and orientation of the user;
determining a new orientation of the user by detecting a change in the user's orientation using an inertial measurement component selected from the group consisting of a gyroscope and a magnetometer and combinations thereof;
estimating the length of the user's footstep; and
updating the user's position and orientation by adding a vector to the user's prevision position and orientation;
  wherein the vector is the length of the user's estimated footstep; and
  wherein the vector points in a direction substantially parallel to the new orientation of the user.

9. A method for modeling a 3D sound field in an auditory augmented reality experience comprising:
loading a map of a physical space;
determining a position of a user within the map;
populating the map with one or more original sound sources;
populating the map with one or more reflected sound sources;
  wherein the reflected sound sources include only those reflected sound sources within a predetermined radius of the position of the user; and
producing one or more waveform-functions for the original sound sources and the reflected sound sources.

10. The method of claim 9 wherein the original and reflected sound sources are sounds related to a haunted house game.

11. The method of claim 9 further comprising:
determining an orientation of the user's head;
generating one or more head related impulse response functions for the head of the user;
executing one or more head related impulse response functions with respect to the one or more waveform functions to produce one or more sets of real-time waveforms; and
outputting sound to the user representing the sum of the one or more sets of real-time waveforms.

* * * * *